(12) United States Patent
Sase et al.

(10) Patent No.: US 10,634,150 B2
(45) Date of Patent: Apr. 28, 2020

(54) SURGING DETECTION METHOD AND SURGING DETECTION DEVICE FOR TURBOCHARGER

(71) Applicant: MITSUBISHI HEAVY INDUSTRIES ENGINE & TURBOCHARGER, LTD., Sagamihara-shi, Kanagawa (JP)

(72) Inventors: Ryo Sase, Tokyo (JP); Naoki Yahata, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 0 days.

(21) Appl. No.: 15/781,877

(22) PCT Filed: Mar. 8, 2016

(86) PCT No.: PCT/JP2016/057165
§ 371 (c)(1),
(2) Date: Jun. 6, 2018

(87) PCT Pub. No.: WO2017/154105
PCT Pub. Date: Sep. 14, 2017

(65) Prior Publication Data
US 2018/0355876 A1 Dec. 13, 2018

(51) Int. Cl.
*F04D 27/00* (2006.01)
*F02B 39/16* (2006.01)
(Continued)

(52) U.S. Cl.
CPC ............ *F04D 27/001* (2013.01); *F02B 37/12* (2013.01); *F02B 39/16* (2013.01);
(Continued)

(58) Field of Classification Search
CPC .... F02B 2037/125; F02B 37/12; F02B 39/16; F02D 2041/288; F02D 41/0007; F02D 41/22; F04D 27/001; F05B 2270/1081
See application file for complete search history.

(56) References Cited

U.S. PATENT DOCUMENTS

| 9,328,949 B2 * | 5/2016 | Blaiklock ........... F04D 27/0207 |
| 2004/0115064 A1 * | 6/2004 | Bleile ..................... F02B 37/12 417/34 |

(Continued)

FOREIGN PATENT DOCUMENTS

| DE | 102 41 892 A1 | 3/2004 |
| DE | 102012222202 A1 | 6/2014 |

(Continued)

OTHER PUBLICATIONS

Extended European Search Report effective Feb. 15, 2019 issued in the corresponding EP Application No. 16893437.0.
(Continued)

*Primary Examiner* — Jesse S Bogue
(74) *Attorney, Agent, or Firm* — Birch, Stewart, Kolasch & Birch, LLP

(57) ABSTRACT

A method of detecting surging in a turbocharger provided for an internal combustion engine, includes: a first characteristic quantity calculation step of calculating a first characteristic quantity in at least one first frequency region corresponding to at least one first peak frequency component unique to the time of occurrence of surging in the turbocharger on the basis of a time-variable waveform indicating a time-series change of a rotation speed of the turbocharger; a second characteristic quantity calculation step of calculating a second characteristic quantity in a second frequency region including the at least one first frequency region on the basis of the time-variable waveform; and a detection step of detecting surging in the turbocharger on the basis of a (Continued)

relationship between the first characteristic quantity and the second characteristic quantity. The second frequency region further includes at least one second peak frequency unique to the time of acceleration and deceleration of the internal combustion engine from among frequency components different from the at least one first peak frequency component.

8 Claims, 7 Drawing Sheets

(51) Int. Cl.
*F02D 41/22* (2006.01)
*F02D 41/00* (2006.01)
*F02B 37/12* (2006.01)
*F02D 41/28* (2006.01)

(52) U.S. Cl.
CPC ......... *F02D 41/0007* (2013.01); *F02D 41/22* (2013.01); *F02B 2037/125* (2013.01); *F02D 2041/288* (2013.01); *F05B 2220/40* (2013.01); *F05B 2270/1081* (2013.01)

(56) References Cited

U.S. PATENT DOCUMENTS

| | | | | |
|---|---|---|---|---|
| 2008/0034753 | A1* | 2/2008 | Furman | F04D 27/001 60/605.1 |
| 2009/0293477 | A1 | 12/2009 | Shu et al. | |
| 2010/0236531 | A1 | 9/2010 | Shimizu et al. | |
| 2010/0250101 | A1* | 9/2010 | Kawabe | F02D 41/0007 701/104 |
| 2012/0100011 | A1* | 4/2012 | Sommer | F04D 27/02 417/44.1 |
| 2013/0013168 | A1* | 1/2013 | Shu | F02B 39/16 701/102 |
| 2013/0309060 | A1* | 11/2013 | Johnsen | F04D 27/001 415/1 |
| 2015/0308859 | A1 | 10/2015 | Lerchenmueller | |
| 2015/0337747 | A1* | 11/2015 | de Cesare | F02D 41/18 701/102 |
| 2016/0305353 | A1* | 10/2016 | Sase | F02B 37/013 |
| 2018/0363541 | A1* | 12/2018 | Sase | F02D 41/0007 |

FOREIGN PATENT DOCUMENTS

| | | |
|---|---|---|
| EP | 2 224 112 A1 | 9/2010 |
| EP | 2 930 337 A1 | 10/2015 |
| JP | 4209350 B2 | 1/2009 |
| JP | 4502277 B2 | 7/2010 |

OTHER PUBLICATIONS

Communication pursuant to Article 94(3) EPC dated Oct. 14, 2019 in corresponding European Aplication No. 16893437.0.
Office Action dated Dec. 31; 2019 in corresponding Chinese Application No. 201680076665.8.
Office Action dated Mar. 4, 2020, issued in the corresponding EP Application No. 16893437.0.

* cited by examiner

ROTATION SPEED r (t)

TA

SURGE COMPONENT

TB

FIG. 6C BPF (FW1)

TC    TB

BPF (FW2)

TC    TB

SURGE INDEX (P/Q)

TB

ROTATION SPEED r (t)

SURGE COMPONENT
TA

BPF (FW1)
TB

BPF (FW2)
TC

SURGE INDEX (P/Q)
TC

TB

SURGING DETECTION METHOD AND SURGING DETECTION DEVICE FOR TURBOCHARGER

TECHNICAL FIELD

The present disclosure relates to a technology for detecting surging of a turbocharger or a predictor of surging, in order to avoid or prevent surging of a turbocharger provided for an internal combustion engine.

BACKGROUND ART

In a turbocharger, surging is a phenomenon that, when a turbocharger is operated in a state where the intake flow rate of the compressor on the intake-system side is low, the operation state of the intake compression mechanism inside the compressor vibrates, and the intake flow rate, the intake pressure and the rotation speed fluctuate, where the turbocharger may become incapable of operating in a serious case. The operation characteristics of a turbocharger can be evaluated by using a pressure curve which represents a relationship between the pressure ratio and the intake flow rate of a compressor. In this case, the surging region in which surging of a turbocharger occurs exists in a region with a relatively low intake flow rate compared to a pressure ratio.

When the operation state of a turbocharger enters the turbocharger, abnormal sounds occur due to fluctuation of the boost pressure of the pressure wave vibration, where the turbocharger may become damaged from vibration of the operation state of the compressor in a serious case. Thus, to avoid or prevent damage of the like of a turbocharger, it is necessary to detect occurrence of surging or its predictor at an earliest possible state, and to perform operation for surging avoidance. As described above, surging of a turbocharger can be detected on the basis of a relationship between the pressure ratio and the intake flow rate of a compressor. Thus, surging can be detected by monitoring measurement values of the pressure ratio and the intake flow rate of the turbocharger with a pressure sensor and an intake flow rate sensor provided additionally for the turbocharger. However, additionally providing a pressure sensor and an intake flow rate for a turbocharger may lead to an increase in the costs and work hours for manufacturing turbochargers, and thus is not desirable.

Patent Document 1 discloses a surging detection mechanism for detecting surging by using only a rotation-speed sensor normally provided for a common turbocharger for measuring the rotation speed of the turbocharger turbine shaft, without additionally providing a pressure sensor and an intake flow rate sensor for the turbocharger. The surging detection mechanism described in Patent Document 1 calculates a rotation speed suitable as the rotation speed of a turbocharger on the basis of the current engine rotation speed and the current engine load, and determines that surging is occurring if the measurement value of the current rotation speed of the turbocharger is not smaller than the above suitable rotation speed.

CITATION LIST

Patent Literature

Patent Document 1: JP4502277B

SUMMARY

Problems to be Solved

However, in an engine provide with a turbocharger, the rotation speed of the turbocharger may show an abnormal value greater than an appropriate value also at the time of acceleration and deceleration of the engine. Thus, in the surging detection mechanism disclosed in Patent Document 1, even if surging is not occurring in the turbocharger, the measurement value of the rotation speed of the turbocharger may exceed the suitable rotation speed of the turbocharger at the time of acceleration and deceleration of the engine. Accordingly, the surging detection mechanism disclosed in Patent Document 1 may wrongly detect occurrence of surging at the time of acceleration and deceleration of the engine, even though surging is not actually occurring. At this time, performing operation for avoiding surging by reducing the pressure ratio of the turbocharger in response to the wrong detection may cause the following undesirable problem. That is, the boost pressure of the turbocharger decreases at the time of acceleration of the engine, which reduces the actual acceleration performance compared to the designed acceleration performance of the turbocharger when accelerating the engine.

In view of the above, an object of some embodiments of the present invention is to provide a detection method and a detection device capable of detecting occurrence of surging in a turbocharger only when surging is actually occurring as correctly as possible, without wrongly detecting occurrence of surging in a turbocharger at the time of acceleration and deceleration of the engine.

Solution to the Problems (1) A method of detecting surging in a turbocharger provided for an internal combustion engine, according to some embodiments of the present invention, includes: a first characteristic quantity calculation step of calculating a first characteristic quantity in at least one first frequency region corresponding to at least one first peak frequency component unique to the time of occurrence of surging in the turbocharger on the basis of a time-variable waveform indicating a time-series change of a rotation speed of the turbocharger; a second characteristic quantity calculation step of calculating a second characteristic quantity in a second frequency region including the at least one first frequency region on the basis of the time-variable waveform; and a detection step of detecting surging in the turbocharger on the basis of a relationship between the first characteristic quantity and the second characteristic quantity. The second frequency region further includes at least one second peak frequency unique to the time of acceleration and deceleration of the internal combustion engine from among frequency components different from the at least one first peak frequency component.

Generally, when detecting surging in a turbocharger by focusing on the frequency component in the time-series variable waveform of the rotation speed of the turbocharger, the following problem occurs. That is, when the frequency component of the time-series variable waveform of the rotation speed of the turbocharger is observed, the peak frequency component unique to the occurrence of surging appears frequently not only at the time of occurrence of surging, but also at the time of acceleration and deceleration of the internal combustion engine. Thus, when focusing on only the peak frequency component unique to the time of occurrence of surging, it is difficult to tell apart whether appearance of the peak frequency component is due to occurrence of surging or due to acceleration or deceleration of the internal combustion engine.

Meanwhile, the frequency range where the peak frequency component unique to the time of acceleration and deceleration of the internal combustion engine appears is considerably wider than the frequency range where the peak frequency component unique to the time of occurrence of surging appears. This is, in another perspective, when surging is actually occurring, the peak frequency unique to the time of occurrence of surging appears in both of the first frequency region and the second frequency region. Meanwhile, at the time of acceleration and deceleration of the internal combustion engine, of the peak frequency unique to acceleration and deceleration, the frequency component excluding the peak frequency unique to the time of occurrence of surging appears only in the second frequency region. As a result, while there is no apparent difference in the configuration of the peak frequency component between the first frequency region and the second frequency region at the time of occurrence of surging, there is an apparent difference in the configuration of the peak frequency component between the first frequency region and the second frequency region at the time of acceleration and deceleration of the internal combustion engine.

Thus, according to the above method (1), it is possible to determine presence or absence of a difference in the configuration of the peak frequency component between the first frequency region and the second frequency region from a relationship between the first characteristic quantity and the second characteristic quantity calculated in the first frequency region and the second frequency region, respectively. Therefore, according to the above method (1), it is possible to detect occurrence of surging in the turbocharger only when surging is actually occurring as correctly as possible, without wrongly detecting occurrence of surging in the turbocharger at the time of acceleration and deceleration of the engine.

(2) In an embodiment, in the above method (1), the first characteristic quantity calculation step includes obtaining, as the first characteristic quantity, a square value of a first amplitude of a frequency component included in the first frequency region from the time-variable waveform for each point of time, and calculating a first waveform obtained by smoothing a time change of the square value of the first amplitude by moving average calculation, the second characteristic quantity calculation step includes obtaining, as the second characteristic quantity, a square value of a second amplitude of a frequency component included in the second frequency region from the time-variable waveform for each point of time, and calculating a second waveform obtained by smoothing a time change of the square value of the second amplitude by moving average calculation, and the detection step includes calculating a ratio between an instantaneous amplitude of the first waveform and an instantaneous amplitude of the second waveform at each point of time as an instantaneous amplitude ratio at each point of time, and determining that surging is occurring in a time section where the instantaneous amplitude ratio is not smaller than a predetermined threshold.

According to the above method (2), whether the amplitude of the frequency component waveform included in each of the first frequency region and the second frequency region is positive or negative, it is possible to evaluate the magnitude of the amplitude as electricity by obtaining a square of the absolute value of the amplitude. Furthermore, the first waveform and the second waveform are obtained by smoothing the time series of a square value of the amplitude at each point of time by moving average calculation. Thus, each of the first waveform and the second waveform corresponds to the time change of the electric spectrum of the time variable waveform in the first frequency region and the second frequency region. As a result, according to the above method (2), a difference in the configuration of the peak frequency component between the first frequency region and the second frequency region, which serves as the reference of surging detection, can be converted into a specific numerical value as a difference in the electric spectrum of the frequency component waveform between the first frequency region and the second frequency region.

Furthermore, in the above method (2), in a case where smoothing by the moving average calculation is not performed, the first waveform and the second waveform include a high frequency component corresponding to noises that fluctuate irregularly and a low frequency component corresponding to the overall fluctuation trend that changes slowly. Furthermore, the proportion of the irregular high frequency component to the amplitude of the first waveform and the second waveform is generally high. Thus, in a case where the high frequency component is not removed from the first waveform and the second waveform by performing the above smoothing by the moving average calculation, the ratio between the instantaneous amplitude of the first waveform and the instantaneous amplitude of the second waveform includes a great error due to the noises that fluctuate irregularly. Thus, according to the above method (2), by performing smoothing by the moving average calculation, the noises that fluctuate irregularly are removed from the first waveform and the second waveform, so that the ratio between the instantaneous amplitude of the first waveform and the instantaneous amplitude of the second waveform can be calculated correctly.

Furthermore, the above method (2) includes calculating the ratio of the instantaneous amplitude between the waveform obtained as a temporal change of the electric spectrum in the first frequency region and the waveform obtained as a temporal change of the electric spectrum in the second frequency region. Further, according to the above method (2), it is possible to determine that surging is occurring if the ratio of the instantaneous amplitude is not smaller than a predetermined threshold. This is because, while energy of the peak frequency component concentrates only to the first frequency region at the time of occurrence of surging and the ratio increases considerably, energy of the peak frequency component spreads widely over the second frequency region at the time of acceleration and deceleration of the internal combustion engine, and the ratio decreases considerably. In other words, at the time of occurrence of surging, the energy of the entire peak frequency component has a high proportion of the energy included in the first frequency region. In contrast, at the time of acceleration and deceleration of the internal combustion engine, energy of all the peak frequency component spreads widely over the second frequency region, and thus the proportion of energy included in the first frequency region is relatively small. Thus, if an appropriate value is set as a predetermined threshold, it is possible to detect occurrence of surging correctly according to the above method (2).

(3) In an illustrative embodiment, in the above method (1), the first characteristic quantity calculation step includes calculating, as the first characteristic quantity, a first POA value corresponding to the first frequency region on the basis of a discrete frequency component obtained by performing discrete Fourier transform on the time-variable waveform, the second characteristic quantity calculation step includes calculating, as the second characteristic quantity, a second POA value corresponding to the second frequency region on the basis of a discrete frequency component obtained by performing discrete Fourier transform on the time-variable waveform, and the detection step includes determining whether surging is occurring in the turbocharger, on the basis of a result of comparison of a ratio between the first POA value and the second POA value with a predetermined threshold.

According to the above method (3), a difference in the configuration of the peak frequency component between the first frequency region and the second frequency region, which serves as the reference of surging detection, can be converted into a specific numerical value as a difference in the two POA values calculated for the first frequency region and the second frequency region, respectively. Furthermore, according to the above method (3), after performing the discrete Fourier transform on the time variable waveform of the rotation speed of the turbocharger, the first POA value and the second POA value are calculated for the first frequency region and the second frequency region, respectively. Thus, it is possible to easily perform the calculation for taking out the frequency component included in each of the first frequency region and the second frequency region from the time variable waveform, without using a filter circuit. Specifically, from a plurality of discrete frequency components obtained by the discrete Fourier transform, it is possible to take out a desired frequency component waveform by simply selecting the discrete frequency component included in each of the first frequency region and the second frequency region, and the discrete Fourier transform can be easily implemented by using a commercially available fast Fourier transform (FFT) circuit.

(4) In an illustrative embodiment, in the above methods (1) to (3), the first characteristic quantity calculation step including changing the at least one first frequency region in accordance with the at least one first peak frequency component which changes in accordance with the rotation speed of the internal combustion engine, and the second characteristic quantity calculation step includes changing the second frequency region in accordance with a change of the at least one first frequency region corresponding to the rotation speed of the internal combustion engine.

According to the above method (4), even if the peak frequency unique to the time of occurrence of surging changes in accordance with the rotation speed of the internal combustion engine, it is possible to change the first frequency region corresponding to the change in the peak frequency. Thus, according to the above method (4), even if the peak frequency unique to the time of occurrence of surging changes in accordance with the rotation speed of the internal combustion engine, it is possible to detect occurrence of surging correctly.

(5) In an illustrative embodiment, in the above methods (2) to (4), the detection step includes determining the predetermined threshold in accordance with a rotation speed and a load of the internal combustion engine.

According to the above method (5), even if the appropriate numerical range of the threshold to be compared to the instantaneous amplitude changes in accordance with the rotation speed and the load of the internal combustion engine, it is possible to change the threshold corresponding to the change in the rotation speed and the load. Thus, according to the above method (5), even if the rotation speed and the load change, it is possible to detect occurrence of surging correctly by comparing the instantaneous amplitude with a suitable threshold corresponding to the rotation speed and the load.

(6) In an illustrative embodiment, in the above method (5), the detection step includes determining the predetermined threshold in accordance with the rotation speed and the load of the internal combustion engine by searching a search table specifying a correspondence relationship between the predetermined threshold and the rotation speed and the load of the internal combustion engine.

According to the above method (6), even if the appropriate numerical range of the threshold to be compared to the instantaneous amplitude changes in accordance with the rotation speed and the load of the internal combustion engine, it is possible to implement a system for determining a suitable setting value of the threshold in accordance with the rotation speed and the load, through a simple search table. Furthermore, according to the above method (6), it is possible to determine a suitable setting value of the threshold from current values of the rotation speed and the load through a simple calculation at a high speed.

(7) In an illustrative embodiment in the above methods (1) to (6), the time-variable waveform is calculated from a rotation speed data obtained by measuring the rotation speed at each point of time in a time-series manner with a rotation-speed measurement sensor mounted to the turbocharger, the first characteristic quantity calculation step includes calculating the first characteristic quantity by inputting the time-variable waveform into a first bandpass filter configured to pass only frequencies in the first frequency region, and applying a predetermined calculation process to an output signal of the first bandpass filter, and the second characteristic quantity calculation step includes calculating the second characteristic quantity by inputting the time-variable waveform into a second bandpass filter configured to pass only frequencies in the second frequency region, and applying a predetermined calculation process to an output signal of the second bandpass filter.

According to the above method (7), the first bandpass filter and the second bandpass filter realize a system for extracting the frequency component waveform included in the first frequency region and the second frequency region, respectively, from the time variable waveform of the rotation speed of the turbocharger. Furthermore, the above method (7) includes calculating the first characteristic quantity and the second characteristic quantity by further calculating the two respective frequency component waveforms extracted by the first bandpass filter and the second bandpass filter through another calculation unit. Thus, according to the above method (7), it is possible to realize a system for performing the above methods (1) to (6), through a specific hardware having a simple configuration.

(8) A turbocharger surging detection device for detecting surging of a turbocharger mounted to an internal combustion engine, according to some embodiments of the present invention, includes: a first characteristic quantity calculation part configured to calculate a first characteristic quantity in at least one first frequency region corresponding to at least one first peak frequency component unique to the time of occurrence of surging in the turbocharger on the basis of a time-variable waveform indicating a time-series change of a rotation speed of the turbocharger; a second characteristic quantity calculation part configured to calculate a second characteristic quantity in a second frequency region entirely including the at least one first frequency region on the basis of the time-variable waveform; and a detection part configured to detect surging in the turbocharger on the basis of a relationship between the first characteristic quantity and the second characteristic quantity. The second frequency region further includes at least one second peak frequency unique to the time of acceleration of the internal combustion engine from among frequency components different from the at least one first peak frequency component.

Generally, when detecting surging in a turbocharger by focusing on the frequency component in the time-series variable waveform of the rotation speed of the turbocharger, the following problem occurs. That is, when the frequency component of the time-series variable waveform of the rotation speed of the turbocharger is observed, the peak frequency component unique to the occurrence of surging appears frequently not only at the time of occurrence of surging, but also at the time of acceleration of the internal combustion engine. Meanwhile, the frequency range where the peak frequency component unique to the time of acceleration or deceleration of the internal combustion engine is considerably wider than the frequency range where the peak frequency component unique to the time of occurrence of surging. This is, in another perspective, when surging is actually occurring, the peak frequency unique to the time of occurrence of surging appears in both of the first frequency region and the second frequency region. Meanwhile, at the time of acceleration and deceleration of the internal combustion engine, of the peak frequency unique to acceleration and deceleration, the frequency component excluding the peak frequency unique to the time of occurrence of surging appears only in the second frequency region. As a result, while there is no apparent difference in the configuration of the peak frequency component between the first frequency region and the second frequency region at the time of occurrence of surging, there is an apparent difference in the configuration of the peak frequency component between the first frequency region and the second frequency region at the time of acceleration or deceleration of the internal combustion engine.

Thus, in the above configuration (1), it is possible to determine presence or absence of a difference in the configuration of the peak frequency component between the first frequency region and the second frequency region from a relationship between the first characteristic quantity and the second characteristic quantity calculated in the first frequency region and the second frequency region, respectively. Therefore, in the above configuration (8), it is possible to detect occurrence of surging in the turbocharger only when surging is actually occurring as correctly as possible, without wrongly detecting occurrence of surging in the turbocharger at the time of acceleration and deceleration of the engine.

(9) A turbocharger surging detection device for detecting surging of a turbocharger disposed in an internal combustion engine, according to some embodiments of the present invention, includes: a time variable waveform calculation part configured to calculate a time variable waveform of the rotation speed from rotation data obtained by measuring in time series the rotation speed for each point of time with a rotation speed measurement sensor; a first bandpass filter configured to output a first characteristic quantity by passing only a frequency component included in the first frequency region, of the time variable waveform, and further applying a predetermined calculation; a second band pass filter configured to output a second characteristic quantity by passing only a frequency component contained in the second frequency region, of the time variable waveform, and further applying a predetermined calculation; a first filter setting part configured to set, to the first band pass filter, the first frequency region corresponding to at least one first peak frequency component which is unique to the time of occurrence of surging in the turbocharger, in accordance with a change in the at least one peak frequency component corresponding to a rotation speed of the internal combustion engine; a second filter setting part configured to set, to the second bandpass filter, a second frequency region including the first frequency region set by the first filter setting part; and a surging occurrence detection part configured to detect surging in the turbocharger by comparing a ratio between the first characteristic quantity and the second characteristic quantity to a predetermined threshold. The second frequency region further includes at least one second peak frequency component which is unique to the time of acceleration and deceleration of the internal combustion engine, of frequency components different from the at least one peak frequency component.

With the above configuration (9), the first bandpass filter and the second bandpass filter realize a system for extracting the frequency component waveform included in the first frequency region and the second frequency region, respectively, from the time variable waveform of the rotation speed of the turbocharger. Furthermore, the above configuration (9) includes calculating the first characteristic quantity and the second characteristic quantity by further calculating the two respective frequency component waveforms extracted by the first bandpass filter and the second bandpass filter through another calculation unit. Thus, according to the above configuration (9), it is possible to realize a system for performing the above methods (1) to (6), through a specific hardware having a simple configuration.

Furthermore, with the above configuration (9), even if the peak frequency unique to the time of occurrence of surging changes in accordance with the rotation speed of the internal combustion engine, it is possible to change the first frequency region corresponding to the change in the peak frequency, and reset the changed first frequency region to the first bandpass filter. Furthermore, if the second peak frequency region is also changed in accordance with a change of the first frequency region corresponding to the rotation speed of the internal combustion engine as described above, it is possible to reset the changed second frequency region to the second bandpass filter. Thus, according to the above configuration (9), even if the peak frequency unique to the time of occurrence of surging changes in accordance with the rotation speed of the internal combustion engine, it is possible to detect occurrence of surging correctly.

Advantageous Effects

In view of the above, it is possible to provide a detection method and a detection device capable of detecting occurrence of surging in a turbocharger only when surging is actually occurring as correctly as possible, without wrongly detecting occurrence of surging in a turbocharger at the time of acceleration and deceleration of the engine.

BRIEF DESCRIPTION OF DRAWINGS

FIGS. 6A to 6E are each a graph showing a simulation result of simulating the surging detection method according to some embodiments of the present invention.

DETAILED DESCRIPTION

Figure 1:
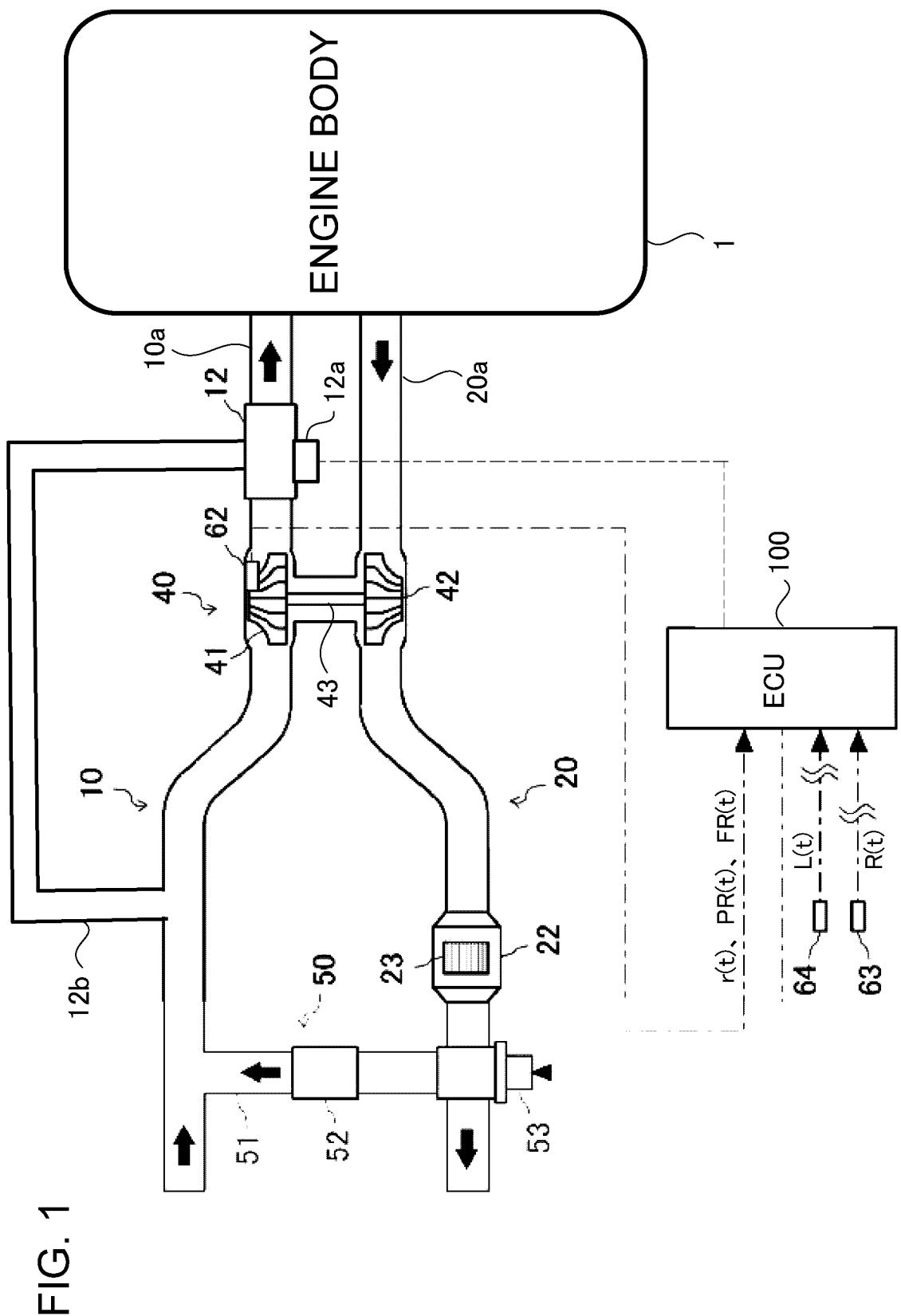
FIG. 1 is a diagram showing an engine including a turbocharger, a surging detection mechanism, and a surging avoidance mechanism.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of an equal state such as "same" "equal" and "uniform" shall not be construed as indicating only the state in which the feature is strictly equal, but also includes a state in which there is a tolerance or a difference that can still achieve the same function. On the other hand, an expression such as "comprise", "include", "have", "contain" and "constitute" are not intended to be exclusive of other components.

Before describing some embodiments according to the present invention, the configuration of an internal combustion engine for applying the surging detection method according to some embodiments of the present invention will be described specifically with reference to FIG. 1. An internal combustion engine includes a turbocharger, a surging detection mechanism and a surging avoidance mechanism. Furthermore, with reference to FIG. 1, operation performed by the surging avoidance mechanism to avoid surging on detection of surging in the turbocharger by the surging detection mechanism will also be described. Subsequently, with reference to FIGS. 2 to 8, a method and a device for detecting surging in a turbocharger according to some embodiments of the present invention will be described in detail.

First, the configuration of an internal combustion engine for applying the surging detection method according to some embodiments of the present invention will be described specifically with reference to FIG. 1. An internal combustion engine includes a turbocharger, a surging detection mechanism and a surging avoidance mechanism. As shown in FIG. 1, an intake manifold 1 is disposed on one side of an engine body 1. Further, the intake manifold 10a is connected to the downstream side of the intake passage 10. The intake passage 10 extends to the intake manifold 10a via a compressor 41 and a return-flow control valve 12 provided for a turbo-type turbocharger (turbocharger) 40. Accordingly, external air is introduced into the intake passage 10 and supplied to each cylinder of the engine body 1 through the intake manifold 10a.

Furthermore, the exhaust system of the engine body 1 will be described. An exhaust manifold 20a is disposed opposite to the intake manifold 10a of the engine body 1. Further, the exhaust manifold 20a is connected to the upstream side of the exhaust passage 20. The exhaust passage 20 extends to the exhaust manifold 20a via a turbine 42 provided for the turbocharger 40. The turbine 42 is connected to the compressor 41 via a turbine shaft 43, so that a rotational force of the turbine 42 generated by a flow of exhaust gas inside the exhaust passage 20 transmits to the compressor 41. An exhaust purification filter 22 supports a catalyst 23. As described above, exhaust gas is introduced into the exhaust passage 20 via the exhaust manifold 20a from each cylinder inside the engine body 1, and is discharged outside.

The EGR device 50 provided for the engine body 1 is connected to the intake passage 10 and the exhaust passage 20. Furthermore, the EGR passage 51 connects the exhaust manifold 20a to the intake passage 10 downstream of the exhaust purification filter 22. The EGR passage 51 includes an EGR cooler 52 for cooling EGR gas (exhaust gas) discharged from the exhaust manifold 20a and an EGR valve 53 for regulating the return-flow amount of the EGR gas.

Next, an engine control unit (ECU) 100 will be described. The ECU 100 includes a CPU, a RAM, a ROM, etc., and stores programs and data, for instance, in advance. The ECU 100 is a control device configured to perform various calculation processes on the basis of signals of sensors, for instance, and send control signals to the respective actuators. Furthermore, the ECU 100 may be configured to perform the surging detection method according to some embodiments of the present invention by executing the programs stored in advance. Furthermore, the ECU 100 may be configured to output control signals to the respective actuators to perform operation for avoiding surging, when surging in the turbocharger 40 is detected according to the surging detection method by executing the programs stored in advance.

In an embodiment shown in FIG. 1 as an example, as sensors for supplying measurement signals to the ECU 100, for instance, a turbocharger rotation-speed measurement sensor 62 for detecting the rotation speed and the rotation angular rate of the compressor 41 of the turbocharger 40, an accelerator position sensor 63 for detecting an engine load or the like, and an engine rotation-speed sensor 64 for detecting an engine rotation speed may be connected to the ECU 100. Furthermore, as actuators controlled by the ECU 100, for instance, a return-flow control valve opening degree control part 12a for controlling the opening degree of the return-flow control valve 12 and an EGR valve 53 may be connected to the ECU 60. Furthermore, a return-flow pipe 12b for returning intake gas extends to the intake passage 10 disposed upstream of the compressor 41 from the return-flow control valve 12.

Hereinafter, control operation of the ECU 100 will be described with reference to FIG. 1, including performing various calculation processes on the basis of signals of the sensors, and sending the control signals to the respective actuators. The ECU 100 receives in time series a turbocharger rotation speed r(t) and a rotation angular rate ω(t) corresponding to the rotation velocity of the compressor 41 at time t in constant sampling periods, from the turbocharger rotation-speed measurement sensor 62. Furthermore, the ECU 100 receives in time series a pressure ratio PR(t) of the compressor 41 at time t and an intake flow rate FT(t) of the turbocharger 40 at time t in constant sampling periods, from the turbocharger rotation-speed measurement sensor 62. Furthermore, the unit of the turbocharger rotation speed r(t) is rpm, and the unit of the rotation angular rate ω(t) is radian/min. Meanwhile, the ECU 100 receives in time series an engine load L(t) and an engine rotation speed R(t) at time t in constant sampling periods, from the accelerator position sensor 63 and the engine rotation-speed sensor 64.

The ECU 100 executes calculation for detecting occurrence of surging in the turbocharger 40 according to the surging detection method described below with reference to FIGS. 2 to 8, on the basis of the turbocharger rotation speed r(t), the rotation angular rate ω(t), the engine load L(t), and the engine rotation speed R(t) received in time series. As a result, at the time when surging in the turbocharger 40 is detected according to the surging detection method, the ECU 100 outputs a control signal to the return-flow control valve opening degree control part 12a and the EGR valve 53 to perform operation for avoiding surging. Specifically, at the time when surging of the turbocharger 40 is detected, a control signal commanding to increase the opening degree of the return-flow control valve 12 is transmitted to the return-flow control valve opening degree control part 12a. The return-flow control valve opening degree control part 12a receiving the control signal increases the opening degree of the return-flow control valve 12, and thereby increases the return flow amount of intake gas to be returned to the upstream side of the compressor 41 from the downstream side of the compressor 41 via the return-flow pipe 12b. Furthermore, at the time when surging in the turbocharger 40 is detected, the ECU 100 increases the opening degree of the EGR valve 53 by transmitting a control signal commanding to increase the opening degree of the valve to the EGR valve 53. As the ECU 100 performs the above operation, the pressure ratio of the upstream-side intake pressure to the downstream-side pressure of the compressor 41 decreases, and the boost pressure of the turbocharger 40 is adjusted, which makes it possible to control the operational point of the turbocharger 40 to be out of the surging region.

Next, with reference to FIGS. 2 to 8, a method and a device for detecting surging in the turbocharger 40 according to some embodiments of the present invention will be described in detail. An object of the surging detection method describe below with reference to FIGS. 2 to 8 is to overcome the following problem that rises when detecting surging in the turbocharger 40 by focusing on the frequency component in the time-series variable waveform r(t) of the rotation speed of the turbocharger 40. That is, when the frequency component of the time-series variable waveform r(t) of the rotation speed of the turbocharger 40 is observed, the peak frequency component unique to the occurrence of surging appears frequently not only at the time of occurrence of surging, but also at the time of acceleration and deceleration of the engine body 1 (internal combustion engine). Thus, when focusing on only the peak frequency component unique to the time of occurrence of surging, it is difficult to tell apart whether appearance of the peak frequency component is due to occurrence of surging or due to acceleration or deceleration of the engine body 1 (internal combustion engine).

Figure 2:
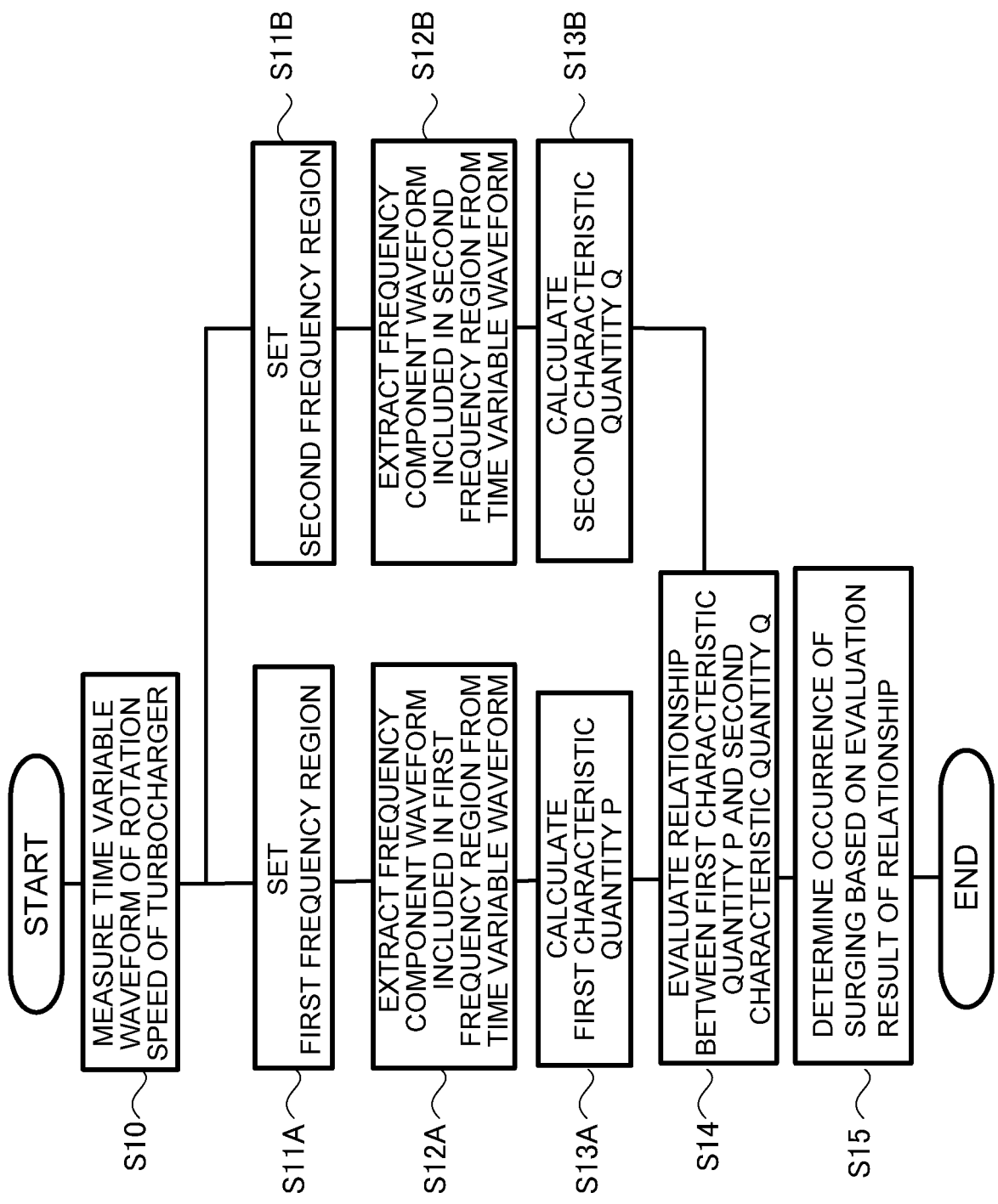
FIG. 2 is a flowchart showing an execution process of the surging detection method according to some embodiments of the present invention.

FIG. 2 is a flowchart showing an execution process of the surging detection method according to some embodiments of the present invention. In the flowchart in FIG. 2, the method is executed starting from step S10, and a time variable waveform r(t) indicating a time-series change of the rotation speed of the turbocharger 40 is obtained. Specifically, as shown in FIG. 1, the ECU 100 receives in time series a measurement signal of the turbocharger rotation speed r(t) of the compressor 41 at time t in constant sampling periods, from the turbocharger rotation-speed measurement sensor 62.

Next, execution of the flowchart in FIG. 2 advances to step S11A and step S11B. In step S11A, at least one first frequency region FW1 corresponding to the at least one first peak frequency component PF1 unique to the time of occurrence of surging in the turbocharger 40 is set. For instance, in an embodiment, in step S11A, as the first frequency region FW1, a frequency range including at least one first peak frequency component PF unique to the time of occurrence of surging in the turbocharger 40 and including a frequency component in the vicinity of the first peak frequency component PF may be set. In step S11B, the second frequency region FW2 is set. Herein, the second frequency region WF2 is set to include not only the first frequency region FW1, but also at least one second peak frequency region PF2 unique to acceleration and deceleration of the engine body 1 from among frequency components different from the first peak frequency component PF1.

Next, execution of the flowchart in FIG. 2 advances to step S12A and step S12B. In step S12A, a frequency component waveform CW1 included in the first frequency region FW1 is extracted from the time variable waveform r(t) representing a time-series change of the rotation speed of the turbocharger 40. In step S12B, a frequency component waveform CW2 included in the second frequency region FW2 is extracted from the time variable waveform r(t) representing a time-series change of the rotation speed of the turbocharger 40. Next, execution of the flowchart in FIG. 2 advances to step S13A and step S13B. In step S13A, a first characteristic quantity P is calculated on the basis of the waveform CW1 obtained by extracting a frequency component included in the first frequency region FW1 from the time variable waveform r(t). In step S13B, a second characteristic quantity Q is calculated on the basis of the waveform CW2 obtained by extracting a frequency component included in the second frequency region FW2 from the time variable waveform r(t).

By executing processes of steps S11A to S13A, on the basis of the time-variable waveform r(t) representing a time-series change of the rotation speed of the turbocharger 40, it is possible to calculate the first characteristic quantity P in the at least one first frequency region FW1 corresponding to the at least one first peak frequency component RF1 unique to the time of occurrence of surging in the turbocharger 40. Furthermore, by executing processes of steps S11B to S13B as described above, on the basis of the time-variable waveform r(t), it is possible to calculate the second characteristic quantity in the at least one second frequency region FW2 including the at least one first peak frequency region FW1.

Next, execution of the flowchart of FIG. 2 advances to step S14 of evaluating a relationship between the first characteristic quantity P calculated in step S13A and the second characteristic quantity Q calculated in step S13B. Next, execution of the flowchart of FIG. 2 advances to step S15 of determining presence or absence of occurrence of surging in the turbocharger 40 on the basis of an evaluation result in step S14. In an illustrative embodiment, for instance, if the ratio of instantaneous amplitude between the first characteristic quantity P and the second characteristic quantity Q is greater than a predetermined threshold, it is possible to determine that surging is occurring in the turbocharger 40.

By executing the above series of processing steps, the surging detection method shown in FIG. 2 overcomes the problem of telling apart whether appearance of the peak frequency component unique to the time of occurrence of surging is due to occurrence of surging or acceleration/deceleration of the engine body 1, as follows. As described above, the frequency range where the peak frequency component unique to the time of acceleration or deceleration of the engine body 1 (internal combustion engine) appears is considerably wider than the frequency range where the peak frequency component unique to the time of occurrence of surging appears. Thus, when surging is actually occurring, the peak frequency PF1 unique to the time of occurrence of surging appears in both of the first frequency region FW1 and the second frequency region FW2. On the other hand, at the time of acceleration and deceleration of the engine body 1 (internal combustion engine), of the peak frequency PF2 unique to acceleration and deceleration, the frequency component excluding the peak frequency PF1 unique to the time of occurrence of surging appears only in the second frequency region FW2. As a result, while there is no apparent difference in the configuration of the peak frequency component between the first frequency region FW1 and the second frequency region FW2 at the time of occurrence of surging, there is an apparent difference in the configuration of the peak frequency component between the first frequency region FW1 and the second frequency region FW2 at the time of acceleration and deceleration of the engine body 1 (internal combustion engine).

Thus, according to the surging detection method shown in FIG. 2, it is possible to determine presence or absence of a difference in the configuration of the peak frequency component between the first frequency region P and the second frequency region Q from a relationship between the first characteristic quantity P and the second characteristic quantity Q calculated in the first frequency region FW1 and the second frequency region FW2, respectively. Therefore, according to the surging detection method, it is possible to detect occurrence of surging in the turbocharger 40 only when surging is actually occurring as correctly as possible, without wrongly detecting occurrence of surging in the turbocharger 40 at the time of acceleration and deceleration of the engine body 1. As a result, it is possible to solve the problem of reduction of the actual acceleration performance compared to the original acceleration performance of the turbocharger 40 due to a decrease in the boost pressure of the turbocharger 40 at the time when the pressure ratio of the turbocharger 40 is reduced to avoid surging in response to wrong detection of surging at the time of acceleration of the engine.

Figure 3A:
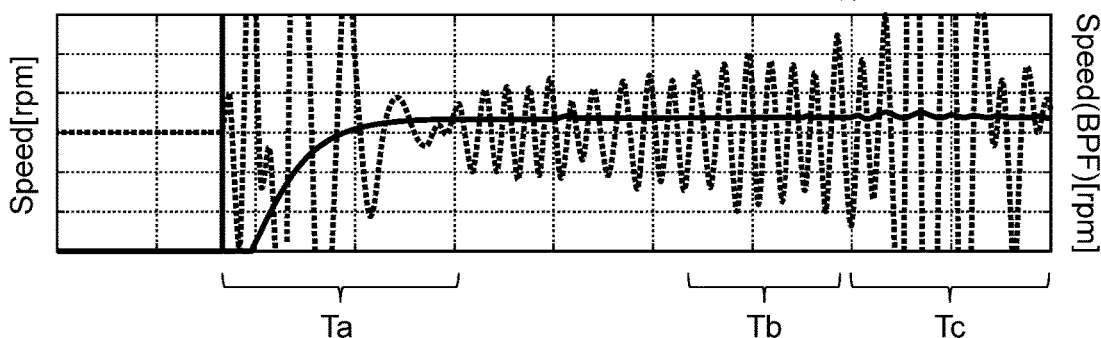
FIGS. 3A to 3D are each a diagram for describing with a graph the operation principle of the surging detection method according to some embodiments of the present invention.

Next, with reference to the example shown in the graph of FIGS. 3A to 3D, the basic principle of the surging detection method shown in FIG. 2 will be described. With reference to FIG. 3A, the solid-line curve in the graph represents the output change of the engine body 1, showing how the engine body 1 accelerates in the time section Ta. In the graph of FIG. 3A, the dotted-line curve represents the time-series time variable waveform r(t) of the rotation speed of the turbocharger 40, showing how the amplitude of r(t) increases and decreases considerably in the time section Ta. Furthermore, in the time section Tb, the graph shows how the amplitude of r(t) increases and decreases considerably due to pre-surge which is a predictor of occurrence of surging. Furthermore, in the time section Tc, the graph shows how the amplitude of r(t) increases and decreases more considerably than in the time section Tb, due to occurrence of surging.

Figure 3B:
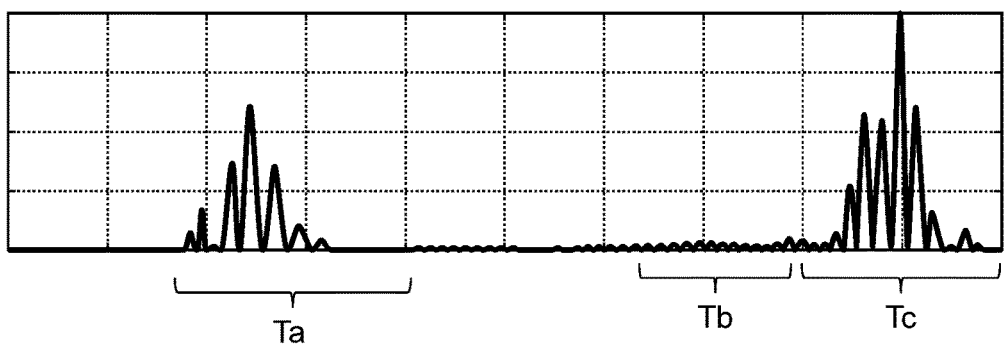
Figure 3C:
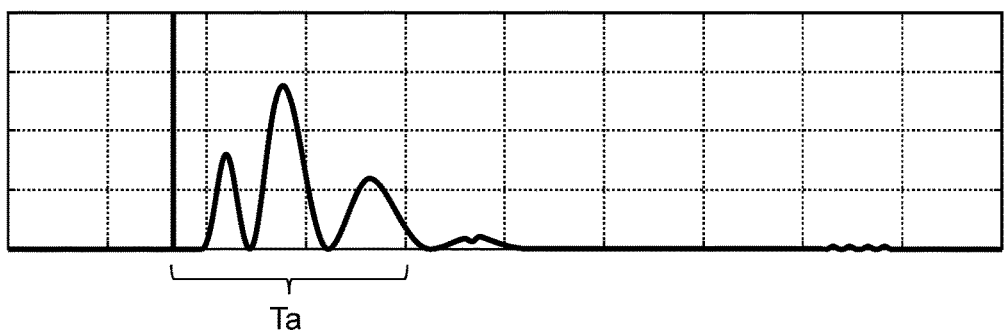

FIG. 3B shows a waveform to which a process of smoothing the time change of a squared amplitude is performed by moving average calculation, for the waveform CW1 obtained by extracting the frequency component included in the first frequency region FW1 from the time variable waveform r(t). That is, the waveform shown in FIG. 3B is the waveform CW1 obtained by extracting the frequency component included in the first frequency region FW1 converted into the fluctuation curve of energy, which corresponds to the time change curve of the first characteristic quantity P calculated in step S13A of FIG. 2. FIG. 3C shows a waveform to which a process of smoothing the time change of a squared amplitude is performed by moving average calculation, for the waveform CW2 obtained by extracting the frequency component included in the second frequency region FW2 from the time variable waveform r(t). That is, the waveform shown in FIG. 3C is the waveform CW2 obtained by extracting the frequency component included in the second frequency region FW2 converted into the fluctuation curve of energy, which corresponds to the time change curve of the second characteristic quantity Q calculated in step S13B of FIG. 2.

The engine body 1 is accelerating in the time section Ta, and thus the peak frequency waveform that appears in the time section Ta corresponds to the peak frequency component PF2 that appears at the time of acceleration and deceleration of the engine body 1. Accordingly, the peak frequency waveform that appears in the time section Ta appears in both of FIG. 3B and FIG. 3C. Meanwhile, pre-surge and surging of the turbocharger 40 are occurring in the time sections Tb and Tc, and thus the peak frequency waveform that appears in the time sections Tb and Tc corresponds to the peak frequency component PF1 that appears at the time of pre-surge and occurrence of surging in the turbocharger 40. Accordingly, the peak frequency waveform that appears in the time sections Tb and Tc appears in FIG. 3B but not in FIG. 3C.

Figure 3D:
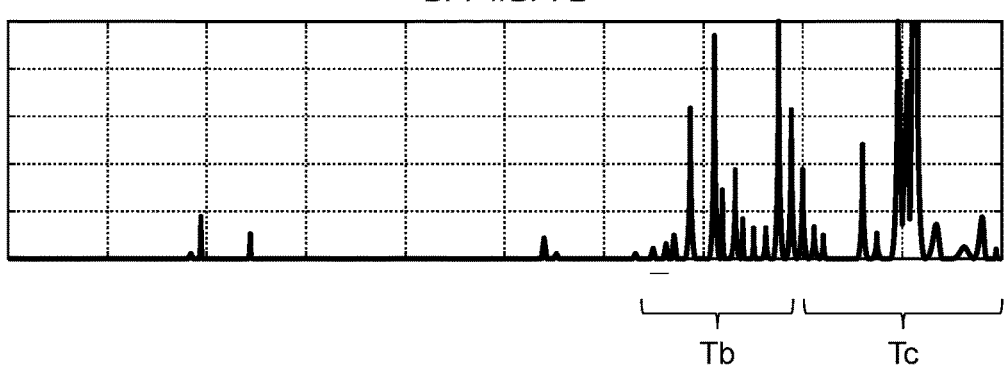

As described above, the frequency range where the peak frequency component unique to the time of acceleration or deceleration of the engine body 1 appears is considerably wider than the frequency range where the peak frequency component unique to the time of occurrence of surging appears. In other words, at the time of occurrence of surging, energy of the peak frequency component concentrates only in the first frequency region FW1. In contrast, at the time of acceleration and deceleration of the engine 1, energy of the peak frequency component spreads widely in the second frequency region FW2. In other words, at the time of occurrence of surging, the energy of the entire peak frequency component has a high proportion of the energy included in the first frequency region FW1. In contrast, at the time of acceleration and deceleration of the engine 1, energy of the entire peak frequency component spreads widely in the second frequency region FW2, and thus the proportion of energy included in the first frequency region FW1 is relatively low. Thus, as shown in FIG. 3D, when comparing the ratio of the instantaneous amplitude between the waveform shown in FIG. 3B (fluctuation curve of the first characteristic quantity P) and the waveform (fluctuation curve o the second characteristic quantity Q) shown in FIG. 3C, the ratio is high only in the time ranges Tb and Tc in which pre-surge and surging of the turbocharger 4 are occurring. Thus, if the ratio of instantaneous amplitude between the first characteristic quantity P and the second characteristic quantity Q is greater than a predetermined threshold, it is possible to determine that pre-surge or surging is occurring in the turbocharger 40. In other words, as shown in steps S14 to S15 of FIG. 2, by evaluating a predetermined relationship between the first characteristic quantity P and the second characteristic quantity Q, it is possible to detect occurring of pre-surge or surging in the turbocharger 40 on the basis of the evaluation result.

Meanwhile, the peak frequency unique to the time of occurrence of surging in the turbocharger 40 may change in accordance with the rotation speed R(t) of the engine body 1, the rotation speed r(t) of the turbocharger 40, the pressure ratio PR(t) of the compressor 41, and the intake flow rate FR(t) of the turbocharger 40. Thus, in an embodiment, when calculating the first characteristic quantity in step S13 of FIG. 2, at least one first frequency region FW1 may be changed in accordance with the at least one first peak frequency component PF1 which changes in accordance with the rotation speed R(t) of the engine body 1. Furthermore, when calculating the second characteristic quantity in step S13 of FIG. 2, the second frequency region FW2 may be changed in accordance with the at least one first peak frequency region FW1 which changes in accordance with the rotation speed R(t) of the engine body 1.

Furthermore, in an alternative embodiment, the peak frequency region FW1 may be changed in accordance with the change of the first peak frequency component PF1 depending on the rotation speed r(t) of the turbocharger 40, the pressure ratio PR(t) of the compressor 41, and the intake flow rate FR(t) of the turbocharger 40, in addition to the rotation speed R(t) of the engine body 1. Furthermore, when calculating the second characteristic quantity in step S13 of FIG. 2 the second peak frequency region FW2 may be changed in accordance with the change of the first peak frequency region FW1 depending on the rotation speed r(t) of the turbocharger 40, the pressure ratio PR(t) of the compressor 41, and the intake flow rate FR(t) of the turbocharger 40, in addition to on the rotation speed R(t) of the engine body 1.

Next, the configuration of the surging detection device 400 configured according to an exemplary embodiment to perform the surging detection method shown in FIG. 2 will be described with reference to FIG. 4. In an embodiment, the surging detection device 400 shown in FIG. 4 may be realized as a circuit inside the ECU 100 in FIG. 1. Furthermore, in another embodiment, the surging detection device 400 shown in FIG. 4 may be realized by the ECU 100 shown in FIG. 1 loading a dedicated program.

Figure 4:
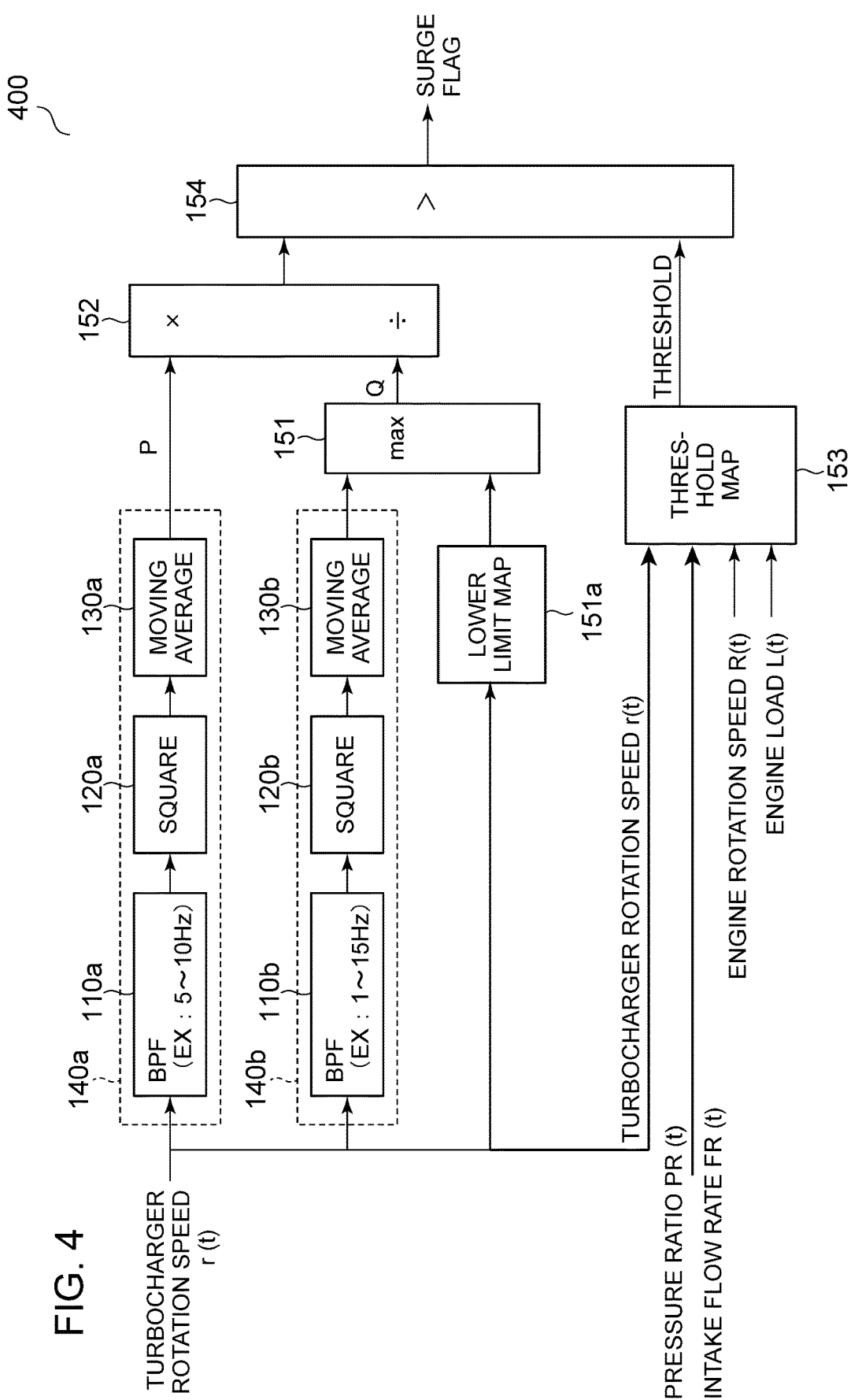
FIG. 4 is a configuration diagram of a surging detection device according to an embodiment of the present invention.

The surging detection device 400 shown in FIG. 4 includes a first circuit 140a and a second circuit 140b configured to be capable of performing concurrent motion with each other, a division circuit connected to output sides of the first circuit 140a and the second circuit 140b, and a comparison circuit 154 configured to compare an output value from the division circuit 152 and a threshold outputted from the threshold map 153. In an embodiment, a lower limit value setting circuit 151 may be interposed between the second circuit 140b and the division circuit 152. Furthermore, the first circuit 140a includes a series circuit including a first bandpass filter 110a (BPF110a), a square calculation circuit 120a, and a moving average calculation circuit 130a connected in series. Furthermore, the first circuit 140b includes a series circuit including a second bandpass filter 110b (BPF110b), a square calculation circuit 120b, and a moving average calculation circuit 130b connected in series.

Hereinafter, how the surging detection device 400 shown in FIG. 4 performs the surging detection method shown in the flowchart of FIG. 2 will be described. First, as the time variable waveform r(t) representing a time-series change of the rotation speed of the turbocharger 40 is obtained according to step S10 of FIG. 2, the time variable waveform r(t) is input into the first bandpass filter 110a and the second bandpass filter 110b. According to an embodiment, the time variable waveform r(t) may be calculated from the rotation speed data obtained by measuring in time series, for each point of time, the rotation speed of the turbocharger 40 with the turbocharger rotation-speed measurement sensor 62 mounted to the turbocharger 40.

Next, according to steps S11A and S12A in FIG. 2, the first bandpass filter 11a outputs the waveform CW1 obtained by extracting the frequency component included in the first frequency region FW1 from the time variable waveform r(t) to the square calculation circuit 120a. Next, the process corresponding to step S13A in FIG. 2 is performed by the square calculation circuit 120a and the moving average calculation circuit 130a. Specifically, the square calculation circuit 120a calculates a square value of the amplitude value (hereinafter, also referred to as square amplitude value) at each point of time of the waveform CW1 received from the first bandpass filter 110a, and outputs in time series the square amplitude value to the moving average calculation circuit 130a. The moving average calculation circuit 130a performs the moving average calculation for the time series of the square amplitude value of the waveform CW1 over a predetermined time window TW each point of time the moving average calculation circuit 130a receives the square amplitude value of the waveform CW1 at each point of time from the square calculation circuit 120a, and outputs the result to the division circuit 152 as a time series of the first characteristic quantity P. Accordingly, the first characteristic quantity P is calculated by inputting the time variable waveform r(t) into the first bandpass filter 110a that passes only the first frequency region FW1, and applying a predetermined calculation process to the output signal of the first bandpass filter 110a.

The above series of operation performed by the first circuit 140a including the first bandpass filter 110a, the square calculation circuit 120a, and the moving average calculation circuit 130a is equivalent to performing the following process. That is, as the first characteristic quantity P, the first circuit 140a obtains a square value of the first amplitude of the frequency component CW1 included in the first frequency region FW1 for each point of time t, and calculates the first waveform PW obtained by smoothing the temporal change of the square value of the first amplitude by moving average calculation.

Furthermore, according to steps S11B and S12B in FIG. 2, the second bandpass filter 110b outputs the waveform CW2 obtained by extracting the frequency component included in the second frequency region FW2 from the time variable waveform r(t) to the square calculation circuit 120b. Next, the process corresponding to step S13B in FIG. 2 is performed by the square calculation circuit 120b and the moving average calculation circuit 130b. Specifically, the square calculation circuit 120b calculates a square value of the amplitude value (hereinafter, also referred to as square amplitude value) at each point of time of the waveform CW2 received from the second bandpass filter 110b, and outputs in time series the square amplitude value to the moving average calculation circuit 130b. The moving average calculation circuit 130b performs the moving average calculation for the time series of the square amplitude value of the waveform CW2 over a predetermined time window TW each point of time the moving average calculation circuit 130b receives the square amplitude value of the waveform CW2 at each point of time from the square calculation circuit 120b, and outputs the result to the division circuit 152 as a time series of the second characteristic quantity Q. Accordingly, the second characteristic quantity Q is calculated by inputting the time variable waveform r(t) into the second bandpass filter 110b that passes only the second frequency region FW2, and applying a predetermined calculation process to the output signal of the second bandpass filter 110b.

The above series of calculation operation performed by the second circuit 140b including the second bandpass filter 110b, the square calculation circuit 120b, and the moving average calculation circuit 130b is equivalent to performing the following process. That is, as the second characteristic quantity Q, the second circuit 140b obtains a square value of the first amplitude of the frequency component CW2 included in the second frequency region FW2 for each point of time t, and calculates the second waveform PW obtained by smoothing the temporal change of the square value of the first amplitude by moving average calculation.

The first characteristic quantity P outputted by the first circuit 140a in time series is outputted to the division circuit 152. Furthermore, the second characteristic quantity Q outputted by the second circuit 140b in time series is outputted to the division circuit 152 via the lower limit value setting circuit 151. At this time, the lower limit value setting circuit 151 monitors whether the value of the second characteristic quantity Q outputted serially in time series from the second circuit 14b is greater than the predetermined lower limit value FW, and if the value of the second characteristic quantity Q is not greater than the lower limit value FL, the value of the second characteristic quantity Q is re-set to the lower limit value F. Herein, the lower limit value FL is set by a lower limit value map circuit 151a shown in FIG. 4. The lower limit value map circuit 151a receives the time variable waveform r(t) of the rotation speed of the turbocharger 40 as an input, and sets the value of the lower limit value F to the lower limit value setting circuit 151 in accordance with the magnitude of the amplitude indicated by the time variable waveform r(t). At this time, the lower limit value map circuit 151a may determine the lower limit value FL in accordance with the rotation speed r(t) of the turbocharger 40 by searching a search table specifying the correspondence relationship between the rotation speed r(t) and the lower limit value FL of the turbocharger 40.

Next, the process corresponding to steps S14 and S15 in FIG. 2 is performed by the division circuit 152 and the comparison circuit 154. Specifically, the first characteristic quantity P outputted by the first circuit 140a and the second characteristic quantity Q outputted by the second circuit 140b are outputted to the division circuit 152, and the division circuit 152 calculates the ratio between the first characteristic quantity P and the second characteristic quantity Q outputted simultaneously from the first circuit 140a and the second circuit 140b and outputs the ratio to the comparison circuit 154. That is, the ratio obtained by dividing the first characteristic quantity P by the second characteristic quantity Q is outputted to the comparison circuit 154. The comparison circuit 154 compares the above ratio received from the division circuit 152 to the threshold received from the threshold map, and if the ratio is not lower than the threshold, outputs a flag signal indicating occurrence of pre-surge or surging in the turbocharger 40.

Interposing the lower limit value setting circuit 151 between the second circuit 140b and the division circuit 152 have the following technical meanings. The first meaning is to set the upper value in a numerical range of the ratio (P/Q), when the ratio (P/Q) is obtained as a result of division of the first characteristic quantity P outputted by the first circuit 140a by the second characteristic quantity Q outputted by the second circuit 140b. That is, by providing the lower limit in the range of the second characteristic quantity Q in the above division, the upper limit is set in a numerical range of the ratio (P/Q) having the second characteristic quantity Q as the denominator. At this time, at the time of occurrence of surging in the turbocharger 40, by adjusting the lower limit value FL in accordance with the magnitude of the amplitude indicated by the time variable waveform r(t) of the rotation speed of the turbocharger 40, it is possible to perform scaling adjustment so that the possible value of the ratio (P/Q) falls within a desired numerical range. In other words, an upper limit is set in the numerical range of the ratio (P/Q) by using the lower limit value F adjusted in accordance with the amplitude indicated by the time variable waveform r(t), and thereby the numerical range of the ratio (P/Q) is normalized in accordance with the desired scaling coefficient.

For instance, in an embodiment, it is possible to adjust the value of the lower limit value FL in accordance with the amplitude indicated by the time variable waveform r(t) observed when surging is occurring in the turbocharger 40. Specifically, if surging occurs in a high rotation-speed region where the rotation speed of the turbocharger 40 is relatively high, the amplitude of the time variable waveform r(t) also increases, but in such a case the value of the lower limit value FL is set to be greater. In contrast, if surging occurs in a low rotation-speed region where the rotation speed of the turbocharger 40 is relatively small, the amplitude of the time variable waveform r(t) also decreases, but in such a case the value of the lower limit value FL is set to be smaller. In this way, the value of the ratio (P/Q) reaches its maximum equal to one at the time of occurrence surging, and the possible value of the ratio (P/Q) falls within a numerical range of $0 \leq P/Q \leq 1$.

Interposing the lower limit value setting circuit 151 between the second circuit 140b and the division circuit 152 have the following second technical meaning. Even if the second characteristic quantity outputted by the second circuit 140b is zero, the value of the second characteristic quantity Q is rewritten into a value greater than zero by the lower limit value setting circuit 151 interposed between the second circuit 140b and the division circuit 152. Thus, through the above function of the lower limit value setting circuit 151, when the division circuit 152 divides the first characteristic quantity P by the second characteristic quantity Q, it is possible to provide a safety measure for preventing division where the denominator is zero.

The above series of calculation operations performed by the division circuit 152 and the comparison circuit 154 is equivalent to performing the following process. That is, the above series of calculation operations calculates the ratio between the instantaneous amplitude of the first waveform PW and the instantaneous amplitude of the second waveform QW at each point of time t as the instantaneous amplitude ratio at each point of time t, and determines that surging is occurring in the time section where the instantaneous amplitude ratio is not smaller than the predetermined threshold.

When detecting surging in the turbocharger 40 by comparing the ratio between the first characteristic quantity P and the second characteristic quantity Q to a predetermined threshold, it may be necessary to change a suitable value to be set as the threshold in accordance with the rotation speed R(t) and the load L(t) of the engine body 1. Thus, in the threshold map 153 in FIG. 4, the threshold may be determined in accordance with the rotation speed R(t) and the load L(t) of the engine body 1 (internal combustion engine). At this time, the threshold map 153 may determine the threshold in accordance with the rotation speed r(t) and the load L(t) of the engine body 1 by searching a search table specifying the correspondence relationship between the threshold and the rotation speed R(t) and the load L(t) of the engine body 1.

Furthermore, the at least one first peak frequency component PF1 which is unique to the time of occurrence of surging of the turbocharger 40 may change in accordance with the rotation speed R(t) of the engine body 1. Thus, in the first circuit 140a shown in FIG. 4, a first filter setting part (not shown) may also be provided, which sets the first frequency region FW1 corresponding to the at least one first peak frequency component PF1 to the first bandpass filter 110a in accordance with the fluctuation of the rotation speed R(t). Furthermore, in the second circuit 140b shown in FIG. 4, a second filter setting part (not shown) may also be provided, which sets the second frequency region FW2 including the first frequency region FW1 set by the first filter setting part to the second bandpass filter 110b.

When detecting surging in the turbocharger 40 by comparing the ratio between the first characteristic quantity P and the second characteristic quantity Q to a predetermined threshold, it may be necessary to change a suitable value to be set as the threshold in accordance with, in addition to the rotation speed R(t) and the load L(t) of the engine body 1, the rotation speed r(t) of the turbocharger, the pressure ratio PR(t) of the compressor 41, and the intake flow rate FR(t) of the turbocharger 40. Thus, in the threshold map 153 in FIG. 4, the threshold may be determined in accordance with, in addition to the rotation speed R(t) and the load L(t) of the engine body 1 (internal combustion engine), the rotation speed r(t) of the turbocharger, the pressure ratio PR(t) of the compressor 41, and the intake flow rate FR(t) of the turbocharger 40. At this time, the threshold map 153 may determine the threshold in accordance with the rotation speed R(t) and the load L(t) of the engine body 1, the rotation speed r(t) of the turbocharger 40, the pressure ratio PR(t) of the compressor 41, and the intake flow rate FR(t) of the turbocharger 40, by searching a search table specifying the correspondence relationship between the threshold and the rotation speed R(t) and the load L(t) of the engine body 1, the rotation speed r(t) of the turbocharger 40, the pressure ratio PR(t) of the compressor 41, and the intake flow rate FR(t) of the turbocharger 40.

Furthermore, the at least one first peak frequency component PF1 unique to the time of occurrence of surging in the turbocharger 40 may change depending on not only the rotation speed R(t) of the engine body 1, but also the rotation speed r(t) of the turbocharger 40, the pressure ratio PR(t) of the compressor 41, and the intake flow rate FR(t) of the turbocharger 40. Thus, in the first circuit 140a shown in FIG. 4, a first filter setting part (not shown) may also be provided, which sets the first frequency region FW1 corresponding to the at least one first peak frequency component PF1 to the first bandpass filter 110a in accordance with the fluctuation of the rotation speed R(t), the rotation speed r(t) of the turbocharger 40, the pressure ratio PR(t) of the compressor 41, and the intake flow rate FR(t) of the turbocharger 40. Furthermore, in the second circuit 140b shown in FIG. 4, a second filter setting part (not shown) may also be provided, which sets the second frequency region FW2 including the first frequency region FW1 set by the first filter setting part to the second bandpass filter 110b.

With the surging detection device 400 shown in FIG. 4, whether the amplitude of the frequency component waveform included in each of the first frequency region FW1 and the second frequency region FW2 is positive or negative, it is possible to evaluate the magnitude of the amplitude as electricity by obtaining a square of the absolute value of the amplitude. Furthermore, the first waveform PW and the second waveform QW are obtained by smoothing the time series of a square value of the amplitude at each point of time by moving average calculation. Thus, each of the first waveform PW and the second waveform QW corresponds to the time change of the electric spectrum of the time variable waveform r(t) in the first frequency region FW1 and the second frequency region FW2. As a result, with the surging detection device 400 shown in FIG. 4, a difference in the configuration of the peak frequency component between the first frequency region FW1 and the second frequency region FW2, which serves as the reference of surging detection, can be converted into a specific numerical value as a difference in the electric spectrum of the frequency component waveform between the first frequency region FW1 and the second frequency region FW2.

Furthermore, with the surging detection device 400 shown in FIG. 4, in a case where smoothing by the moving average calculation is not performed, the first waveform PW and the second waveform QW include a high frequency component corresponding to noises that fluctuate irregularly and a low frequency component corresponding to the overall fluctuation trend that changes slowly. Furthermore, the ratio of the irregular high frequency component to the amplitude of the first waveform PW and the second waveform WQ is generally high. Thus, in a case where the high frequency component is not removed from the first waveform PW and the second waveform QW by performing the above smoothing by the moving average calculation, the ratio between the instantaneous amplitude of the first waveform PW and the instantaneous amplitude of the second waveform QW includes a great error due to the noises that fluctuate irregularly. Thus, with the surging detection device 400 shown in FIG. 4, by performing smoothing by the moving average calculation, the noises that fluctuate irregularly are removed from the first waveform PW and the second waveform QW, so that the ratio between the instantaneous amplitude of the first waveform PW and the instantaneous amplitude of the second waveform QW can be calculated correctly.

Furthermore, the surging detection device 400 shown in FIG. 4 calculates the ratio of the instantaneous amplitude between the waveform obtained as a temporal change of the electric spectrum in the first frequency region FW1 and the waveform obtained as a temporal change of the electric spectrum in the second frequency region FW2. Further, the surging detection device 400 shown in FIG. 4 can determine that surging is occurring if the ratio of the instantaneous amplitude is not smaller than a predetermined threshold. This is because, while energy of the peak frequency component concentrates only to the first frequency region FW1 at the time of occurrence of surging and the ratio increases considerably, energy of the peak frequency component spreads widely over the second frequency region FW2 at the time of acceleration and deceleration, and the ratio decreases considerably. In other words, at the time of occurrence of surging, the energy of the entire peak frequency region FW1 has a high proportion of the energy included in the first frequency region FW1. In contrast, at the time of acceleration and deceleration of the engine 1, energy of entire the peak frequency component spreads widely in the second frequency region FW2, and thus the proportion of energy included in the first frequency region FW1 is relatively small. Thus, if an appropriate value is set as a predetermined threshold, it is possible to detect occurrence of surging with the surging detection device 400 shown in FIG. 4 appropriately.

Next, the configuration of the surging detection device 500 configured according to another embodiment to perform the surging detection method shown in FIG. 2 will be described with reference to FIG. 5. In an embodiment, the surging detection device 500 shown in FIG. 5 may be realized as a circuit inside the ECU 100 in FIG. 1. Furthermore, in another embodiment, the surging detection device 500 shown in FIG. 5 may be realized by the ECU 100 shown in FIG. 1 loading a dedicated program.

Figure 5:
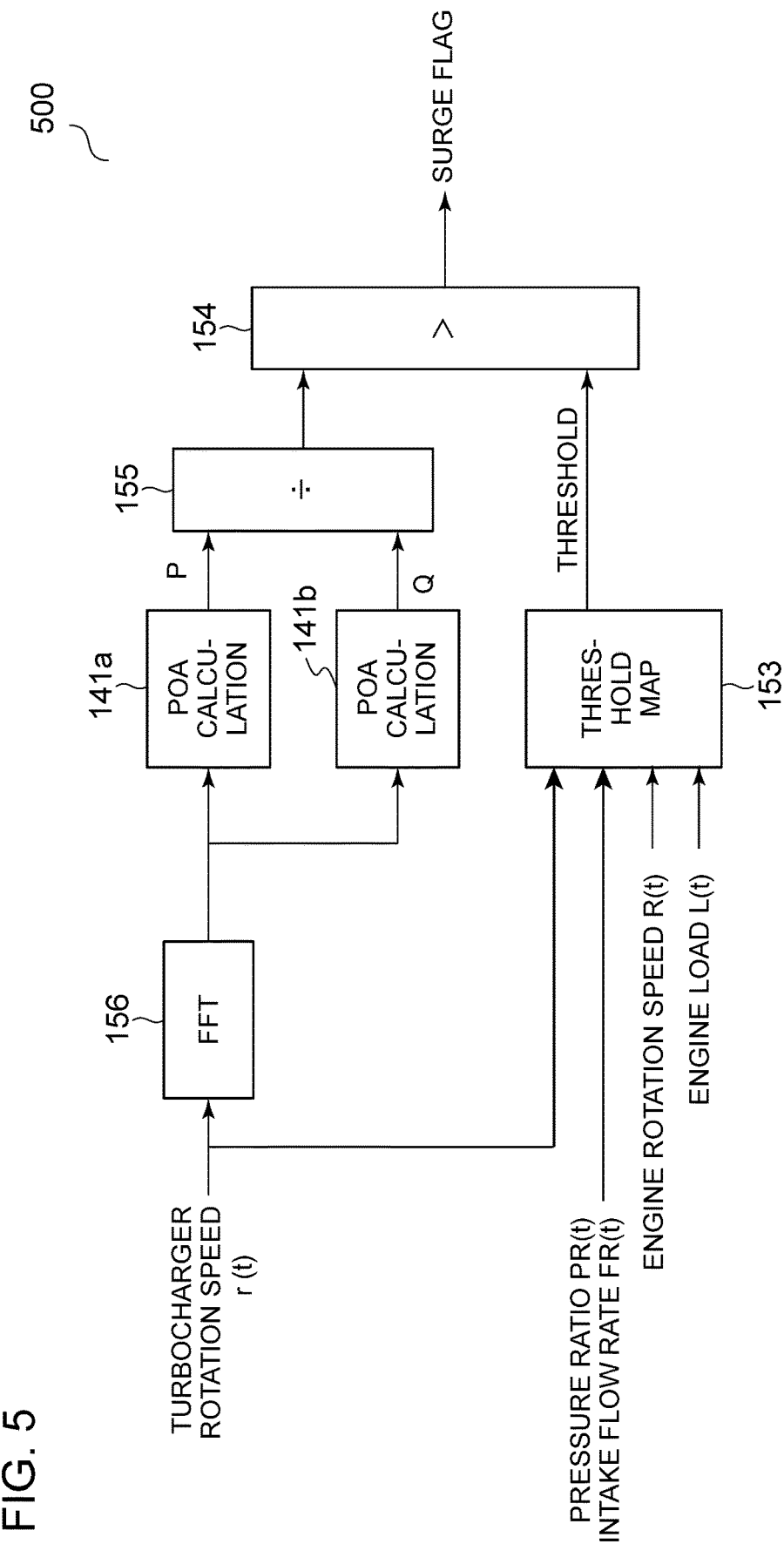
FIG. 5 is a configuration diagram of a surging detection device according to another embodiment of the present invention.

The surging detection device 500 shown in FIG. 5 includes, in addition to the FFT calculation part 156, the first POA calculation part 141*a* and the second POA calculation part 141*b* connected in parallel to each other to the FFT calculation part 156. Furthermore, the surging detection device 500 shown in FIG. 5 includes the division circuit 152 connected to the output sides of the first POA calculation part 141*a* and the second POA calculation part 141*b*, and the comparison circuit 154 configured to compare an output value from the division circuit 152 and a threshold outputted from the threshold map 153.

Hereinafter, how the surging detection device 500 shown in FIG. 5 performs the surging detection method shown in the flowchart of FIG. 2 will be described. First, as the time variable waveform r(t) representing a time-series change of the rotation speed of the turbocharger 40 is obtained, the time variable waveform r(t) is inputted into the FFT calculation part 156. The FFT calculation part 156 executes the discrete Fourier transform (e.g. Fast Fourier transform (FFT)) on the time-series sample of the input time variable waveform r(t). As a result, the FFT calculation part 156 calculates the discrete frequency spectrum expression of the time-series sample of the time variable waveform r(t) as the spectrum data, and outputs the spectrum data to the first POA calculation part 141*a* and the second POA calculation part 141*b*.

Next, the first POA calculation part 141*a* receiving the spectrum data calculated as the discrete frequency spectrum expression of the time variable waveform r(t) from the FFT calculation part 156 extracts the amplitude data corresponding to each of a plurality of discrete frequency components included in the first frequency region FW1 from the spectrum data. Next, the first POA calculation part 141*a* calculates the first POA value PV1 as the first characteristic quantity P, on the basis of the extracted amplitude data. Similarly, the second POA calculation part 141*b* receiving the spectrum data calculated as the discrete frequency spectrum expression of the time variable waveform r(t) from the FFT calculation part 156 extracts the amplitude data corresponding to each of a plurality of discrete frequency components included in the second frequency region FW2 from the spectrum data. Next, the second POA calculation part 141*b* calculates the second POA value PV2 as the second characteristic quantity Q, on the basis of the extracted amplitude data.

Next, the first characteristic quantity P outputted by the first circuit 140*a* and the second characteristic quantity Q outputted by the second circuit 140*b* are outputted to the division circuit 152. Subsequently, the division circuit 152 calculates the ratio between the first characteristic quantity P and the second characteristic quantity Q outputted simultaneously from the first circuit 140*a* and the second circuit 140*b* and outputs the ratio to the comparison circuit 154. That is, the ratio obtained by dividing the first characteristic quantity P by the second characteristic quantity Q is outputted to the comparison circuit 154. The comparison circuit 154 compares the above ratio received from the division circuit 152 to the threshold received from the threshold map, and if the ratio is not lower than the threshold, outputs a flag signal indicating occurrence of pre-surge or surging in the turbocharger 40.

The above series of calculation operations performed by the division circuit 152 and the comparison circuit 154 is equivalent to performing the following process. That is, the above series of calculation operations calculates the ratio between the first POA value PV1 and the second POA value PV2, and determines that surging is occurring at the timing when the ratio reaches a predetermined threshold or higher.

When detecting surging in the turbocharger 40 by comparing the ratio between the first characteristic quantity P and the second characteristic quantity Q to a predetermined threshold, it may be necessary to change a suitable value to be set as the threshold in accordance with, in addition to the rotation speed R(t) and the load L(t) of the engine body 1, the rotation speed r(t) of the turbocharger, the pressure ratio PR(t) of the compressor 41, and the intake flow rate FR(t) of the turbocharger 40. Thus, in the threshold map 153 in FIG. 5, the threshold may be determined in accordance with, in addition to the rotation speed R(t) and the load L(t) of the engine body 1 (internal combustion engine), the rotation speed r(t) of the turbocharger, the pressure ratio PR(t) of the compressor 41, and the intake flow rate FR(t) of the turbocharger 40. At this time, the threshold map 153 may determine the threshold in accordance with the rotation speed R(t) and the load L(t) of the engine body 1, the rotation speed r(t) of the turbocharger 40, the pressure ratio PR(t) of the compressor 41, and the intake flow rate FR(t) of the turbocharger 40, by searching a search table specifying the correspondence relationship between the threshold and the rotation speed R(t) and the load L(t) of the engine body 1, the rotation speed r(t) of the turbocharger 40, the pressure ratio PR(t) of the compressor 41, and the intake flow rate FR(t) of the turbocharger 40.

With the surging detection device 500 shown in FIG. 5, a difference in the configuration of the peak frequency component between the first frequency region FW1 and the second frequency region FW2, which serves as the reference of surging detection, can be converted into a specific numerical value as a difference in the two POA values calculated for the first frequency region FW1 and the second frequency region FW2, respectively. Furthermore, in the surging detection device 500 shown in FIG. 5, after performing the discrete Fourier transform on the time variable waveform r(t) of the rotation speed of the turbocharger 40, the first POA value PV1 and the second POA value PV2 are calculated as the first characteristic quantity P and the second characteristic quantity Q for the first frequency region FW1 and the second frequency region FW2, respectively. Thus, it is possible to easily perform the calculation for taking out the frequency component included in each of the first frequency region FW1 and the second frequency region FW2 from the time variable waveform r(t), without using a filter circuit. Specifically, from a plurality of discrete frequency components obtained by the discrete Fourier transform, it is possible to take out a desired frequency component waveform by simply selecting the discrete frequency component included in each of the first frequency region FW1 and the second frequency region FW2, and the discrete Fourier transform can be easily implemented by using a commercially available fast Fourier transform (FFT) circuit.

Figure 6A:
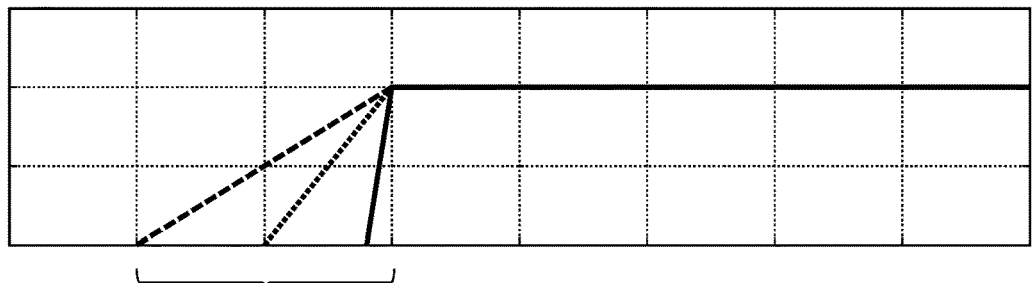

Next, a simulation result in a case where the surging detection method described above with reference to FIGS. 2 to 5 will be described with reference to FIGS. 6A to 6E. FIG. 6A shows a change in the engine output in a case where the engine body 1 accelerates in three different acceleration patterns in the time section TA. In FIG. 6A, the dotted-line acceleration pattern corresponds to acceleration at the lowest acceleration speed, the solid-line acceleration pattern corresponds to acceleration at the highest acceleration speed, and the dotted-line acceleration pattern corresponds to acceleration at an intermediate speed between the two accelerations.

Figure 6B:
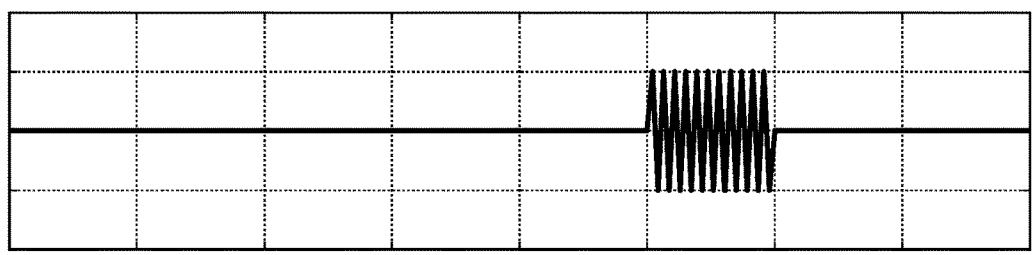
Figure 6B:
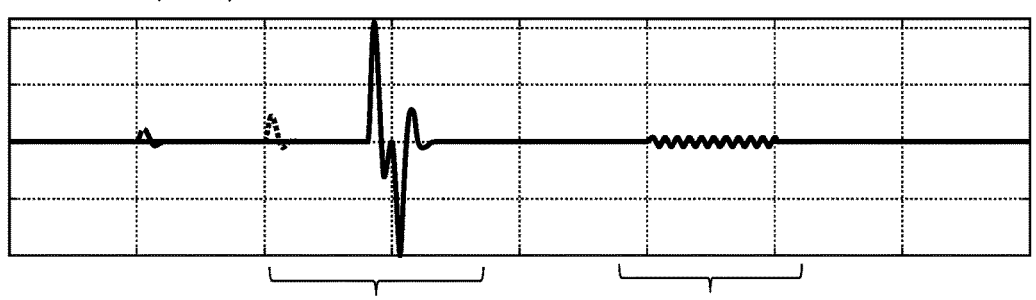
Figure 6D:
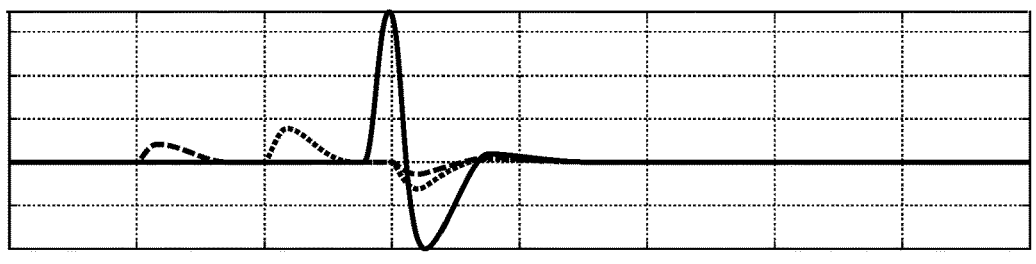

Furthermore, the time section TB shown in FIG. 6B corresponds to the time range in which surging of the turbocharger 40 occurs, and a vibration waveform corresponding to the peak frequency which is unique to occurrence of surging appears in the time section TB in FIG. 6B. Furthermore, FIG. 6C shows a peak waveform that appears as energy fluctuation of the frequency component included in the first frequency region FW1 (time-series change of the first characteristic quantity P), and FIG. 6D shows a peak waveform that appears as energy fluctuation of the frequency component included in the second frequency region FW2 (time-series change of the second characteristic quantity Q). As the engine 1 accelerates according to the three acceleration patterns shown in FIG. 6A at the time of acceleration and deceleration, in the time section TC in FIGS. 6C and 6D, a peak waveform corresponding to the peak frequency component PF2 which is unique to the time of acceleration of the engine. Furthermore, the time section TB shown in FIG. 6B corresponds to the time range in which surging of the turbocharger 40 occurs, and a peak waveform corresponding to the peak frequency component PF1 which is unique to occurrence of surging appears in the time section TB shown in FIG. 6C. In contrast, in the time section TB shown in FIG. 6B, a peak waveform corresponding to the peak frequency component PF1 which is unique to occurrence of surging can be hardly observed.

Figure 6E:
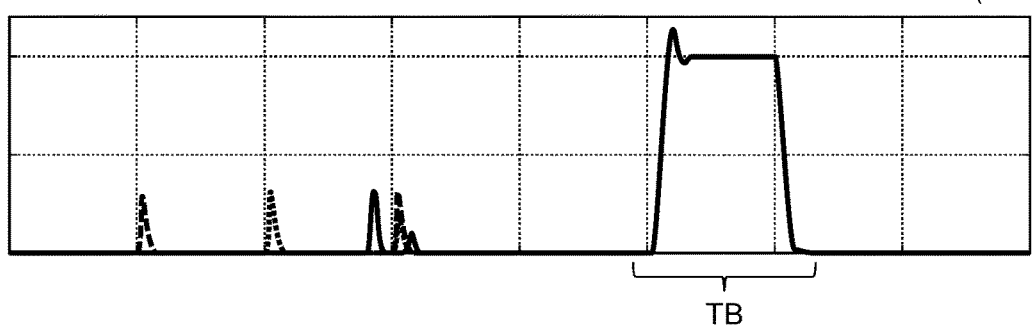
Figure 7A:
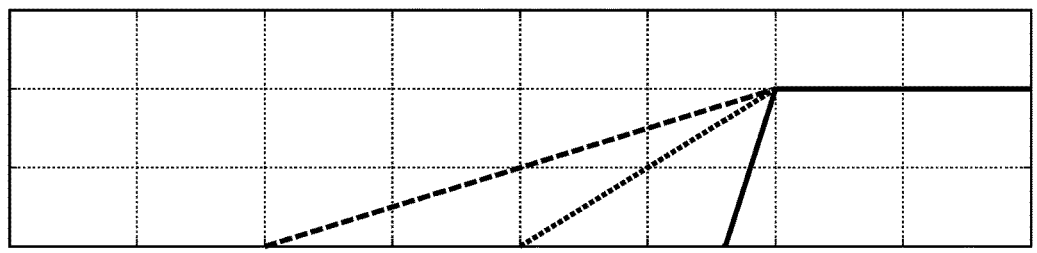
FIGS. 7A to 7E are each a graph showing a simulation result of simulating the surging detection method according to some embodiments of the present invention.
Figure 7B:
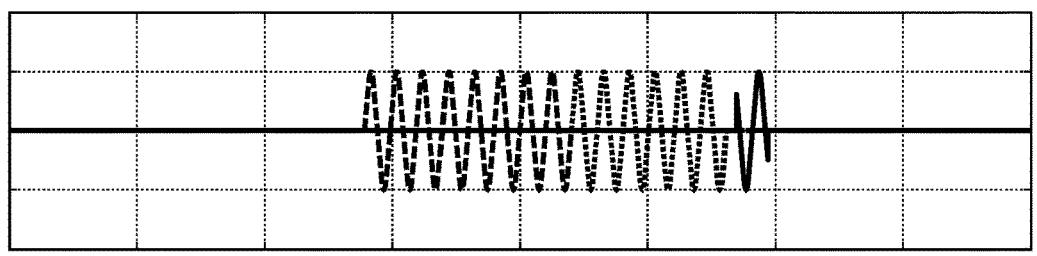
Figure 7C:
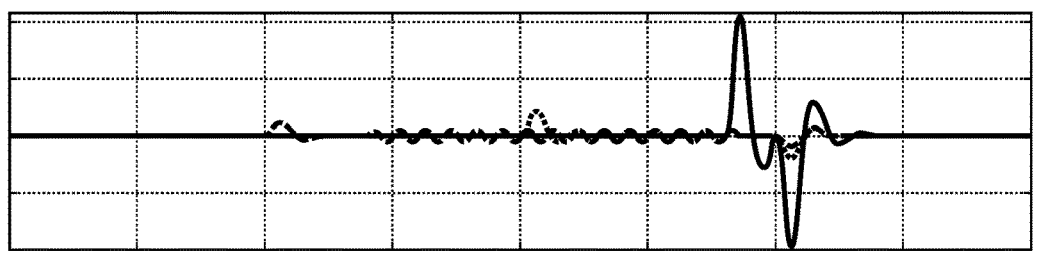
Figure 7D:
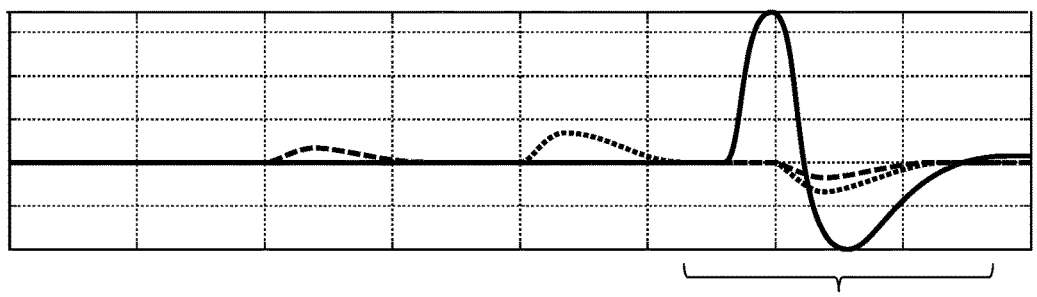
Figure 7E:
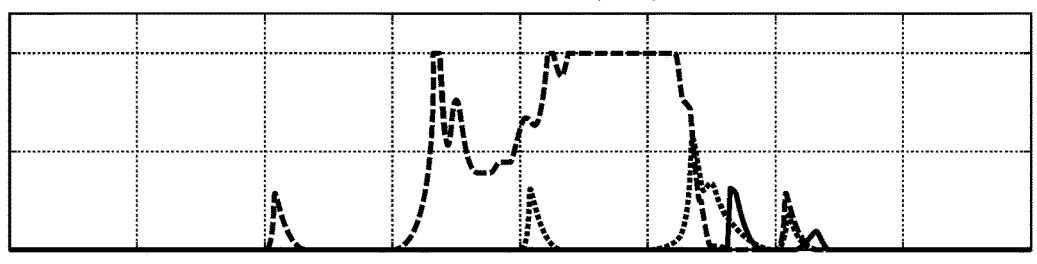

Thus, with reference to FIG. 6E showing the ratio (P/Q) of the amplitude of the waveform shown in FIG. 6C and the amplitude of the waveform shown in FIG. 6D, a peak where the value (P/Q) of the amplitude is great appears in the time section TB. Next, FIGS. 7A to 7E show simulation results of the surging detection method described above with reference to FIGS. 2 to 5 under a different condition setting from FIG. 6 will be described with reference to FIG. 6. In the simulation result of FIG. 7, an acceleration pattern of the engine is set so that acceleration is considerably slower than the simulation result of FIG. 6. Furthermore, in the simulation of FIG. 7, the simulation result is the same as that shown in FIG. 6 except for the engine acceleration period represented by the time section TA and the surging occurrence period represented by the time section TB being set to overlap.

With reference to FIG. 7 showing the change in the ratio (P/Q) of the amplitude between the first characteristic quantity P and the second characteristic quantity Q, the chain-line curve corresponds to the acceleration pattern with the most graduate acceleration, and the influence of the frequency component which is unique to acceleration is relatively small, and thus shows a remarkable peak in the surging occurrence period TB. Furthermore, the dotted-line or solid-line curve corresponds to an acceleration pattern that is more steep than the chain-line curve, and thus the influence of the frequency component which is unique to acceleration is slightly great, and thus the peak waveform in the surging occurrence period TB is lower than the peak waveform represented by the chain line, but still appears as a peak that is clearly recognizable. Thus, also in a case corresponding to the acceleration pattern that is steeper than the curve represented by the chain line, it is possible to detect surging correctly by setting the threshold to be compared to the ratio (P/Q) of the amplitude between the first characteristic quantity P and the second characteristic quantity Q to be slightly low.

Accordingly, from the simulation result shown in FIG. 7, even if the acceleration period and the surging occurrence period of the engine are overlapped, it is possible to detect surging occurrence correctly in the following case. That is, if the amount that concentrates to the first frequency region FW1 is adequately large, of the energy of the frequency spectrum due to surging occurrence, and energy of the frequency spectrum due to engine acceleration is relatively small, of the frequency energy due to engine acceleration, it is possible to detect occurrence of surging correctly by adjusting the above threshold appropriately. Thus, according to the above described surging detection method with reference to FIGS. 2 to 5, even in a case where the engine acceleration period and the surging occurrence period overlap, it is possible to detect surging correctly by appropriately adjusting the threshold to be compared to the ratio (P/Q) of the amplitude in accordance with the steepness of acceleration. Furthermore, in a case where acceleration of the engine is adequately slow, it is possible to detect not only occurrence of surging but also its predictor, pre-surge, correctly, by setting the first frequency region FW1 and the above described threshold.

DESCRIPTION OF REFERENCE NUMERAL

1 Engine body
10 Intake passage
10a Intake manifold
12 Return-flow control valve
12a Return-flow control valve opening degree control part
12b Return-flow pipe
20 Exhaust passage
20a Exhaust manifold
22 Exhaust purification filter
23 Catalyst
40 Turbocharger
41 Compressor
42 Turbine
43 Turbine shaft
50 EGR device
51 EGR passage
52 EGR cooler
62 Turbocharger rotation-speed measurement sensor
63 Accelerator position sensor
64 Engine rotation-speed sensor
110a, 110b Bandpass filter
120a, 120b Square calculation circuit
130a, 130b Moving average calculation circuit
140a First circuit
140b Second circuit
151 Lower limit value setting circuit
152 Division circuit
153 Threshold map
154 Comparison circuit
156 FFT calculation part
400, 500 Surging detection device
r(t) Rotation speed of engine body
R(t) Rotation speed of engine body
L(t) Load of engine body
PR(t) Pressure ratio of compressor
FR(t) Intake flow rate of turbocharger

The invention claimed is:
1. A method of detecting surging in a turbocharger provided for an internal combustion engine, the method comprising:
extracting, from a time-variable waveform corresponding to a time-series change in rotation speed of the turbo- charger over time, a first frequency component waveform over a first frequency range including at least one peak value unique to a time period in which surging in the turbocharger occurs;

extracting, from the time-variable waveform, a second frequency component waveform over a second frequency range including at least one peak value unique to a time period where acceleration and/or deceleration of the internal combustion engine has occurred;

calculating a first characteristic quantity corresponding to at least one peak in the first frequency component waveform;

calculating a second characteristic quantity corresponding to at least one peak in the second frequency component waveform; and detecting surging in the turbocharger on the basis of a relationship between the first characteristic quantity and the second characteristic quantity.

2. The method of detecting surging in a turbocharger according to claim 1, wherein extracting the first frequency component waveform includes obtaining a square value of a first amplitude of a frequency component included in the first frequency range from the time-variable waveform for each point of time, and smoothing a time change of the square value of the first amplitude by moving average calculation, wherein extracting the second frequency component waveform includes obtaining a square value of a second amplitude of a frequency component included in the second frequency range from the time-variable waveform for each point of time, and smoothing a time change of the square value of the second amplitude by moving average calculation, and wherein detecting surging in the turbocharger includes calculating a ratio between an instantaneous amplitude of the first frequency component waveform and an instantaneous amplitude of the second frequency component waveform at each point of time as an instantaneous amplitude ratio at each point of time, and determining that surging is occurring in a time section where the instantaneous amplitude ratio is not smaller than a predetermined threshold.

3. The method of detecting surging in a turbocharger according to claim 1, wherein extracting the first and second frequency component waveforms includes performing discrete Fourier transform on the time-variable waveform, wherein calculating the first characteristic quantity includes calculating, as the first characteristic quantity, a first POA value corresponding to the first frequency range on the basis of a discrete frequency component of the Fourier transform, wherein calculating the second characteristic quantity includes calculating, as the second characteristic quantity, a second POA value corresponding to the second frequency range on the basis of a discrete frequency component of the Fourier transform, and wherein detecting surging in the turbocharger includes determining whether surging is occurring in the turbocharger, on the basis of a result of comparison of a ratio between the first POA value and the second POA value with a predetermined threshold.

4. The method of detecting surging in a turbocharger according to claim 2, wherein detecting surging in the turbocharger includes determining the predetermined threshold in accordance with a rotation speed and a load of the internal combustion engine.

5. The method of detecting surging in a turbocharger according to claim 4, wherein detecting surging in the turbocharger includes determining the predetermined threshold in accordance with the rotation speed and the load of the internal combustion engine by searching a search table specifying a correspondence relationship between the predetermined threshold and the rotation speed and the load of the internal combustion engine.

6. The method of detecting surging in a turbocharger according to claim 1, wherein the at least one first frequency range is set corresponding to the at least one peak in the first frequency component waveform which changes in accordance with a rotation speed of the internal combustion engine.

7. The method of detecting surging in a turbocharger according to claim 1, wherein the time-variable waveform is calculated from a rotation speed data obtained by measuring the rotation speed at each point of time in a time-series manner with a rotation-speed measurement sensor mounted to the turbocharger, wherein extracting the first frequency component waveform includes inputting the time-variable waveform into a first bandpass filter configured to pass only frequencies in the first frequency range, and wherein extracting the second frequency component waveform includes inputting the time-variable waveform into a second bandpass filter configured to pass only frequencies in the second frequency range.

8. A turbocharger surging detection device for detecting surging of a turbocharger mounted to an internal combustion engine, comprising:

processing circuitry configured to extract, from a time-variable waveform corresponding to a time-series change in rotation speed of the turbocharger over time, a first frequency component waveform over a first frequency range including at least one peak value unique to a time period in which surging in the turbocharger occur;

extract, from the time-variable waveform, a second frequency component waveform over a second frequency range including a least one peak value unique to a time period where acceleration and/or deceleration of the internal combustion engine has occurred, the second frequency range including the first frequency range;

calculate a first characteristic quantity corresponding to at least one peak in the first frequency component waveform;

calculate a second characteristic quantity corresponding to at least one peak in the second frequency component waveform; and detect surging in the turbocharger on the basis of a relationship between the first characteristic quantity and the second characteristic quantity.

* * * * *